(12) United States Patent
Jorgenson et al.

(10) Patent No.: US 9,353,297 B2
(45) Date of Patent: May 31, 2016

(54) ENERGY-ACTIVATED ROOM TEMPERATURE-PUMPABLE POLYMER COMPOSITIONS AND DEVICES FOR ACTIVATING AND DISPENSING THE SAME

(71) Applicant: H.B. FULLER COMPANY, St. Paul, MN (US)

(72) Inventors: Michael W. Jorgenson, Quincy, IL (US); David J. Alessio, Amherst, OH (US); Samuel Dipre, Amherst, OH (US); Kenneth E. Heyde, Wellingdon, OH (US); Jeffrey C. Krotine, Strongsville, OH (US); Anthony A. Parker, Newton, PA (US); William C. Stumphauzer, Avon, OH (US); Joseph J. Wolf, Avon, OH (US)

(73) Assignee: H.B. Fuller Company, St. Paul, MN (US)

( * ) Notice: Subject to any disclaimer, the term of this patent is extended or adjusted under 35 U.S.C. 154(b) by 5 days.

(21) Appl. No.: 14/179,969

(22) Filed: Feb. 13, 2014

(65) Prior Publication Data
US 2014/0329937 A1 Nov. 6, 2014

Related U.S. Application Data

(63) Continuation of application No. 12/919,284, filed as application No. PCT/US2009/035115 on Feb. 25, 2009, now Pat. No. 8,691,046.

(60) Provisional application No. 61/031,405, filed on Feb. 26, 2008, provisional application No. 61/031,406, filed on Feb. 26, 2008, provisional application No. 61/031,409, filed on Feb. 26, 2008, provisional application No. 61/041,330, filed on Apr. 1, 2008, provisional application No. 61/108,685, filed on Oct. 27, 2008, provisional application No. 61/119,220, filed on Dec. 2, 2008.

(51) Int. Cl.
| | | |
|---|---|---|
| C09J 131/04 | (2006.01) | |
| C08J 3/21 | (2006.01) | |
| C08J 9/06 | (2006.01) | |

(52) U.S. Cl.
CPC ............ *C09J 131/04* (2013.01); *C08J 3/212* (2013.01); *C08J 9/06* (2013.01); *C08J 2207/02* (2013.01)

(58) Field of Classification Search
CPC ............ C08L 23/0853; C08L 31/04; C09D 123/0853; C09D 131/04; C09J 123/0853; C09J 131/04; C09J 101/02; C09J 103/02; C08K 5/11
See application file for complete search history.

(56) References Cited

U.S. PATENT DOCUMENTS

| | | | | |
|---|---|---|---|---|
| 4,097,558 A | * | 6/1978 | Kuhn | 525/239 |
| 4,670,620 A | * | 6/1987 | Jacobs et al. | 585/640 |
| 2003/0083413 A1 | * | 5/2003 | Stumphauzer | 524/296 |
| 2004/0029980 A1 | * | 2/2004 | Stumphauzer et al. | 516/31 |

OTHER PUBLICATIONS

Microthene technical information, "The Premier Spherical Shape of Microthene® F Microfine Polymer Powders," Equistar, Oct. 2000.*
Fonseca, C., "Vinyl Acetate Polymer," in Handbook of Thermoplastics, Ed. Olabisis and Adewale, CRC Press, 1997, p. 258.*
Hemsley, P., et al. "Assaying protein palmitoylatino in plants," Plant Methods, 4:2, pp. 1-7.*

* cited by examiner

*Primary Examiner* — Liam J Heincer
*Assistant Examiner* — Nicholas Hill
(74) *Attorney, Agent, or Firm* — Kirsten Stone; Kristi Halloran

(57) ABSTRACT

Energy-activated room temperature-pumpable polymer compositions, devices for activating and processing the same into solid cellular or non-cellular polymeric materials that can be used as adhesives, sealants, coatings or gasket materials, and methods of making and using the same. The compositions according to the invention include solid particles that include one or more polymers, which are emulsified, dispersed or suspended in a liquid carrier together with at least one processing aid, such as a reactive blowing agent, a low molecular weight surfactant, a high molecular weight surfactant, one or more compounds found in latex paint, starch, cellulosic derived products and combinations of two or more thereof. The processing aids provide various benefits including, for example, reduced density, improved process hygiene, improved foam stability, faster bonding times and/or lower processing temperatures.

12 Claims, 5 Drawing Sheets

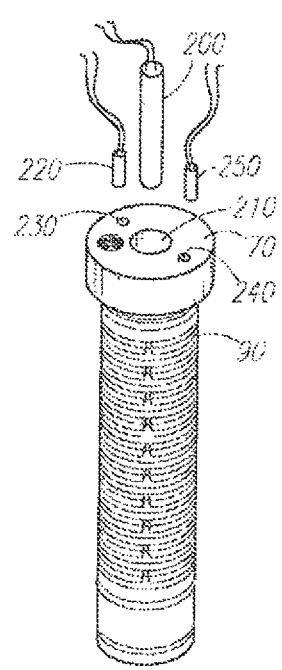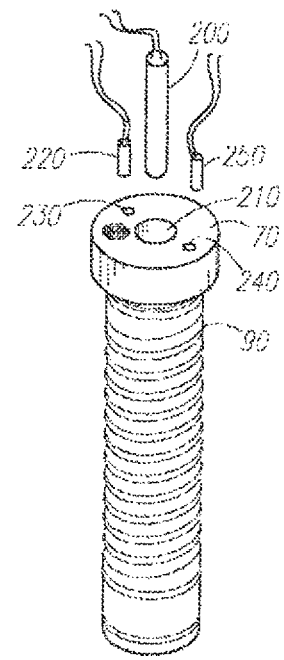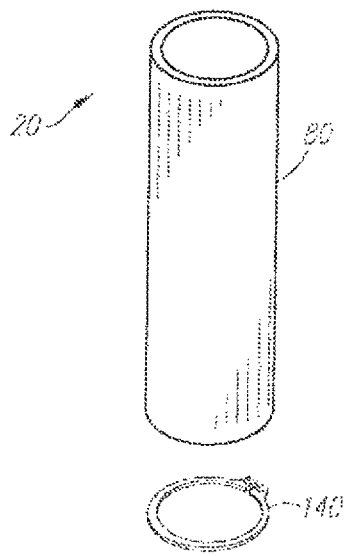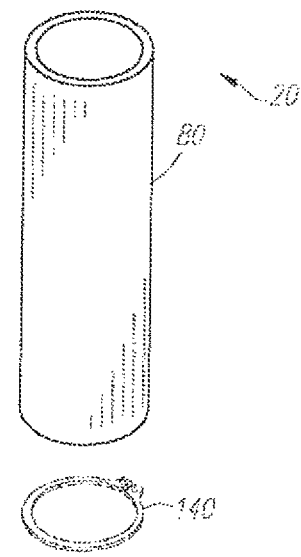
Fig. 6          Fig. 7

ENERGY-ACTIVATED ROOM TEMPERATURE-PUMPABLE POLYMER COMPOSITIONS AND DEVICES FOR ACTIVATING AND DISPENSING THE SAME

REFERENCE TO RELATED APPLICATIONS

This application is a continuation of U.S. application Ser. No. 12/919,284 filed Nov. 10, 2010, now U.S. Pat. No. 8,691,046, which is a 371 National Stage Application of PCT/US/09/35115 filed Feb. 25, 2009, which claims the benefit of 61/031,405 filed Feb. 26, 2008, and claims the benefit of 61/031,406 filed Feb. 26, 2008, and claims the benefit of 61/031,409 filed Feb. 26, 2008, and claims the benefit of 61/041,330 filed Apr. 1, 2008, and claims the benefit of 61/108,685 filed Oct. 27, 2008, and claims the benefit of 61/119,220 filed Dec. 2, 2008 and incorporated herein.

BACKGROUND OF INVENTION

1. Field of Invention

The present invention relates to energy-activated room temperature-pumpable polymer compositions and devices for activating and dispensing the same to form solid cellular or solid non-cellular polymeric materials.

2. Description of Related Art

In conventional systems for dispensing hot melt adhesives, solid thermoplastic pellets of hot melt adhesive composition are conveyed to a hot melt pot or kettle. The pellets are heated, in bulk, in the kettle to a temperature above the melting temperature of the hot melt adhesive composition. The molten hot melt material in the kettle is pumped in a heated state through heated hoses or lines to a plurality of heated remote dispensing devices, which are typically, located a significant distance away from the kettle.

There are several drawbacks with the use of conventional hot melt dispensing systems. For example, there is a significant energy cost involved in melting a bulk amount of the hot melt composition within the kettle and also in conveying the molten material through the heated lines to the heated dispensing equipment. A stability failure of the of the adhesive, sealant, coating or gasketing material and/or heating system can result in plugged lines and significant down time. In addition, unpleasant odors and smoke typically emanate from the kettle. The heated kettle and the heated hoses present safety hazards within the workplace. Furthermore, the complexity of the system makes it difficult and time consuming to service and replace equipment. And, the need to maintain the hot melt adhesive at high temperature for extended periods of time tends to lead to a degradation of the composition and its adhesive properties.

Stumphauzer, et. al., U.S. Pat. No. 7,285,583 (hereinafter "the '583 patent"), the specification of which is hereby incorporated by reference in its entirety, discloses a multiple component polymer composition that is pumpable at room temperature, but which forms a molten hot melt composition when heated above about 300° F. and mixed. The molten hot melt composition can be dispensed to form a solid adhesive material upon cooling. This patent discloses that the composition can include "foaming agents", such as azobisdicarbonamide, for the purpose of generating foam in the molten hot melt composition, which expands the volume and reduces the density of the solid adhesive. Azobisdicarbonamide liberates nitrogen gas when heated. Nitrogen gas is considered to be a non-reactive blowing agent.

Stumphauzer, et. al., U.S. Pat. No. 7,221,859 (hereinafter the '859 patent"), the specification of which is hereby also incorporated by reference in its entirety, discloses a device that can be used to heat a multiple component polymer composition such as disclosed in the '583 patent from its pumpable room temperature state to a temperature at which the material becomes a molten liquid. The device statically mixes the molten liquid, which converts it to a hot melt as it exits from the device into commercially available hot melt dispensing heads. Once the molten material is dispensed from the dispensing head, the material exhibits adhesive properties that are substantially similar to conventional packaging hot melt.

BRIEF SUMMARY OF THE INVENTION

In view of the foregoing, the present invention provides compositions, devices, systems and methods that provide substantial advantages over known hot melt and cold glue systems. The compositions according to the invention exist in a non-molten pumpable state at room temperature (unless otherwise expressly stated, the term "room temperature" is hereby defined as being 72±5° F.) and at other ambient temperatures from about 32° F. to 140° F., preferably 50° F. to 120° F., most preferably 60° F. to 110° F., but can be activated to form substantially homogeneous molten materials that can be dispensed to form cellular or solid non-cellular polymeric solid phase materials upon cooling. The compositions according to the invention comprise solid particles comprising one or more polymers (sometimes hereinafter referred to as the "first component"), which are emulsified, dispersed and/or suspended in a liquid carrier (sometimes hereinafter referred to as the "second component"). Compositions according to the invention further comprise one or a combination of two or more processing aids, such as reactive blowing agents, low molecular weight surfactants, high molecular weight surfactants, one or a combination of two or more compounds present in latex paint and/or starch and cellulosic derived products. The processing aids provide various benefits including, for example, reduced density, improved process hygiene, improved foam stability, faster bonding times and/or lower processing temperatures.

The invention also provides devices that are capable of activating the compositions according to the invention to a fusion temperature and thereby create a substantially, molten, homogeneous material that, when dispensed, is capable of cooling to form a substantially fused solidified mass that exhibits excellent bonding properties. The present invention also provides the methods for producing solid cellular or solid non-cellular polymeric materials that can be used as adhesives, sealants, coatings or gasket materials, and methods of making and using the compositions and devices.

The present invention does not require that a bulk of solid adhesive material be melted in a remote hot melt kettle at temperatures or that molten hot melt material be conveyed in heated hoses to dispensing equipment. The present invention thus eliminates the unpleasant odors and smoke associated with remote kettles and the high energy costs and the safety hazards associated with such systems. Furthermore, the present invention does not require that a bulk of solid adhesive material be maintained at a high temperature for a significant duration of time, and thereby eliminates thermal degradation of the adhesive composition while reducing system complexity that can lead to excessive downtime. Compositions according to the present invention need only to be energy-activated at the point of dispensing, which thus confers many of the advantages of cold glue applications, but has the advantage over cold glue systems of much more rapid speed due to the high solids, the ability to use materials that would normally degrade under extended and repeated exposure to high temperatures and cleaner, faster applications at the elevated temperatures of the point of dispensing.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 6 is an exploded perspective view of the reactor shown in FIG. 4

FIG. 7 is an exploded perspective view of a reactor with an alternative groove system.

DETAILED DESCRIPTION OF THE INVENTION

A. The First Component

Figure 1:
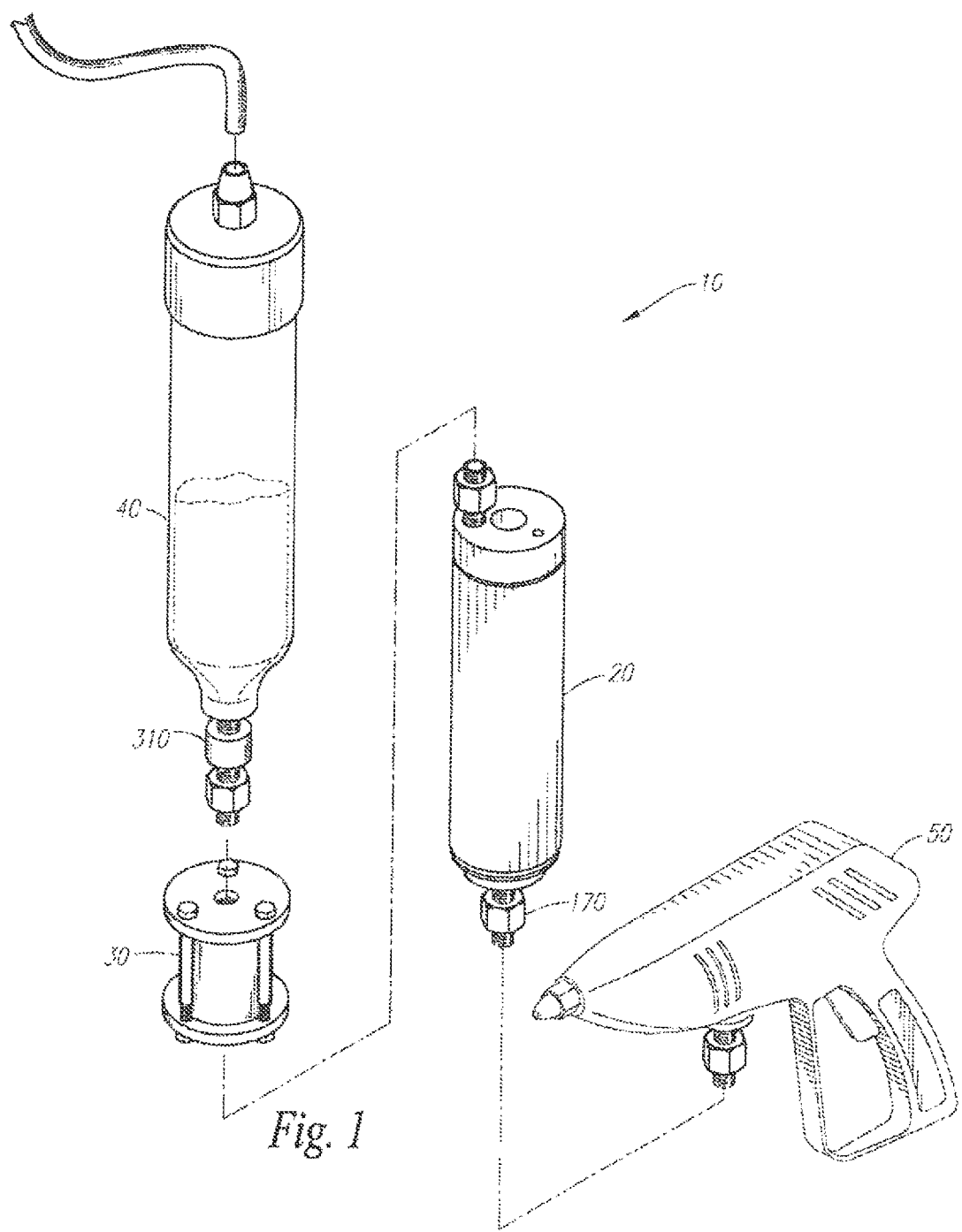
FIG. 1 is a partially exploded perspective view of an exemplary system for activating and dispensing liquid polymer compositions according to the invention.

The first component of the compositions according to the invention comprises solid particles of one or more polymers that can be derived from polymerizing any combination of ethylene, propylene, butylene, higher α-olefins or isomers thereof, styrene and its isomers, isoprene, butadiene, higher α-dienes or isomers thereof, norbornene, dicyclopentadiene, acrylic acid and its derivatives thereof, methacrylic acid and its derivatives thereof, olefinically unsaturated dicarboxylic acid and its derivatives thereof, acrylonitrile, vinyl chloride, vinylidene chloride, vinyl ester, vinyl ethers, vinyl silanes and the like. Additional polymers can be constructed with combinations of starter molecules with reactive hydrogen such as water, sorbitol, glycerol, sucrose, multifunctional amines, and the like, together with or, optionally the monomers by themselves or in combination with themselves such as oxides, for example, ethylene oxide, propylene oxide, tetrahydrofuran, and the like, various multifunctional acids or anhydrides, for example terephthalic acid, phthalic anhydride, adipic acid, succinic anhydride and the like, glycols such as ethylene glycol, propylene glycols, butylene glycol, and the like, and/or various multi-function amines, for example, urea, ethylene diamine, hexamethylene diamine, and the like. These chemicals in various combinations result in polyethers, polyesters, polyamides, polyether amines which can result in high performance finished products. Highly specialized polymers could include silicones formulated for adhesion similar to those used in room temperature vulcanization (RTV's) processes where the silanols condense at high temperatures. Natural polymers such as proteins and their derivatives, starches and theft derivatives, cellulosics and theft derivatives, fats and oils and their derivatives, for example natural and synthetic rubbers, lignins, terpene resins, rosin esters, derivatives of wood, gum, and tall oil rosin can be used in any combination with the above fossil fuel polymers that permits them to be emulsified, dispersed or suspended as solids in the second component (liquid carrier) at room temperature up to about 140° F., and provided the first component is capable of being activated at fusion temperatures to create a substantially, molten, homogeneous material that is capable cooling to form a substantially fused solidified mass. For adhesives, sealants, coatings and gasketing applications, it is also important that the first component be capable of bonding to one or more substrates upon being dispensed.

The polymers used in the first component may be obtained as virgin, recycled or scrap material in the form of pellets, sheets, tubes, rods, films, formed materials, bottles, or the like. However, in order to achieve the proper plastisol viscosity, stability, pumpability and over-all delivery characteristics, such materials should be reduced to an average particle size (diameter) of less than about 3000 microns, preferably less than about 1,500 microns and most preferably below about 1000 microns. Thus, it may be advantageous to purchase the material in the form of a powder or other granular form. This invention has the distinct advantage over conventional plastisols, latex and other dispersion and emulsion technologies where the resultant liquid products have to be virgin materials and often have less than 65% solids that are characterized by a particle size of less than 100 microns.

The actual polymer or combination of polymers used as the first component in the invention is selected based upon the ability of the first component to substantially resist absorption of the second (liquid) component at the storage and pre-processing temperatures, the ability of the first component to irreversibly absorb substantially a majority of the second (liquid) component when the composition is subjected to elevated processing temperatures where the materials are fused and the ability of the first component to prevent exudation of the second (liquid) component from the fused solid material that is formed when the composition cools from the elevated processing temperature. Other factors that influence the selection of polymers include the impact on the viscosity of composition in its pumpable pre-activated state, the impact on the viscosity of the heated, fused mass upon being activated, the impact on equipment life cycles, cost and the like. Ground ethylene vinyl acetate, polypropylene, and polyethylene polymers have been determined to be less susceptible to the affects of fusion temperature than emulsion polymerized ethylene vinyl acetate polymers, allowing for the development of delivery systems where there is an option of using a check valve, heat break/insulator or combinations of these devices to create flexible and simple systems.

The first component may include combinations of polymers that can range from homopolymers to multi-feedstock polymers, copolymerized, step-polymerized, or any combination of the above in the gas or liquid phase. The processes can include addition, condensation, free radical, anion or cation, gas, liquid or solid state, and the like, catalyzed polymerizations. The choice of polymer process and compositions can lead to polymers with random, block, branched, tipped or any combination of these leading to various distributions along the chain or chains.

Special consideration is given to tipped polymers with groups that could be energy activated in the substantially fused, molten blends, for example, amine terminated polyether polyols, blocked isocyanate terminated polymers, maleic anhydride tipped starches where there is the possibility for both esterification and free radical chemistries, acrylate tipped polymers, multiple silane tipped polymers, and the like. In addition, polymers that have grafted monomers and functionality on the polymer chain can lead to further enhancements.

Judicious choice of these parameters ultimately leads to various macrostructures that could include standard structure polymeric materials capable of being ground, higher or lower crystallinity polymers, spherical or jagged particles, core and shell particles, and the like.

A combination of the micro-structure and the resultant macro-structure can affect the stability, viscosity, rheological properties, and the like, of the liquid emulsions, dispersion and/or suspensions below 140° F. The solids can be in the form of same polymer type with the same or different particle size distributions and characteristics or combinations of different polymer types with the same or different particle size distributions and characteristics. Cryogenically ground ethylene vinyl acetates assumed to be jagged particles in combination with emulsion polymerized ethylene vinyl acetates which were smooth round particles gave a dispersion and/or suspension liquid composition that had much lower viscosities than the ground ethylene vinyl acetates at the same solids level in soybean oil. If ultra-small particles of polypropylene and/or polyethylene were emulsified in a soy bean oil, the liquid compositions could be further stabilized. The significance of these choices of combinations are further exemplified by the fact that similar ground particle size polypropylenes and polyethylenes contributed much less to viscosity on a solids basis than comparable cryogenically ground ethylene vinyl acetate polymers in soybean oil. While not to be bound to any particular theory, it is speculated that the choice of the polymer and its molecular weight and polarity, for example, higher polarity, lower molecular weight ethylene vinyl acetate and higher polarity soybean oil have more surface interaction than the non-polar polypropylenes, regardless of the polypropylene molecular weight, with the soybean oil. In other cases, the cryogenically ground ethylene vinyl acetate with fine particles of inorganics, for example calcium carbonate, had lower viscosities than the comparable solids of ground ethylene vinyl acetate by themselves. Similar relationships of starches and their derivatives, cellulosics and their derivatives, fats and their derivatives and proteins and their derivatives are anticipated in the case of the polar liquid carriers, for example glycerol, propylene glycol, ethylene carbonate and/or propylene carbonate, and the like, or non-polar liquids, for example vegetable oils, biodiesel and/or mineral oils, and the like.

Particles having less crystallinity may result in liquid compositions below 140° F. that are more stable dispersions and/or emulsions against separation, may melt faster improving the capacity of the process to produce a substantially homogeneous, fused molten mass and resultant cooled product and result in a tougher final product when cooled below 140° F. For example, linear low density polyethylene made from ethylene and higher α-olefins, such as butene, hexene, octene or the like, can be chosen as a non-polar polymer that has lower melt viscosity and improved elongation in the finished product or ethylene vinyl acetates with higher levels of vinyl acetate up to 50%, preferably up to 40%, and most preferably up to 30% have been found to lead to better adhesion over a broader range of substrates or ethylene acrylic acid and/or methacrylic acid copolymers and terpolymers result in higher polarity materials which show increased bonding to glossy acrylic coatings.

Urethanes, polyamides, silicones, polyesters may be chosen as a function of their performance at low and high temperatures, the adhesion characteristics to polar, high surface energy surfaces such as cellulosics and minerals, the adhesion characteristics to non-polar, low surface energy surfaces such as polyethylene and TEFLON®. For example, polyamides and silicones would be more preferable at higher temperatures. Polyesters would be useful in high modulus situations and polyurethanes would be useful in low modulus situations. Within series of homologous polymers, the repeating units could further determine the performance, for example elongation in urethanes, a high molecular weight difunctional polyalkylene oxide repeating unit would have greater elongation than a low molecular weight comparable polyalkylene oxide repeating unit.

The ultimate choice of polymer(s) for the first component will be a function of many criteria discussed above in addition to the stability to oxidation and radiation such as light, microwaves, costs, degree of transparency to radiation, the tack time which is that time when the energized polymer is no longer sticky, process hygiene, set time which is the time the application is workable, bond time described below, open time which is the time the application can be moved without damaging the finished product characteristics, stiffness, hardness, density which is a function of both the polymer and blowing agent, volume, flexibility, conformability, resilience, creep, elongation, strength modulus elongation, chemical resistance, temperature resistance, environmental resistance and compressibility and the like.

B. The Second Component

The second component must be a liquid phase material at room temperature. The second component enables the composition to be pumpable at room temperatures up to 110° F., preferably up to 115° F. and most preferably up to about 140° F. and contributes to the quality and unique properties of the fused matrix on cooling. The second component may be chosen by optimizing several factors including cost, reactivity at storage conditions and dispensing temperatures, compatibility with the first component at various temperatures, volatility, safety considerations, regulatory approvals, and the like. Suitable materials for use as the second component include low volatility solvents, tall oils, liquid plasticizers, aliphatic hydrocarbons, hydrocarbon esters, vegetable oils and their derivatives, glycerol and its derivatives, glycols and their derivatives, polyols and alkoxylates. Such liquids must be substantially stable with the first component, processing aids and optional liquid or solid components at temperatures less than about 85° F., preferably less than about 100° F. and most preferably less than about 140° F.

Liquid natural products such as vegetable oils and their derivatives and by products, fats, carbohydrates and their derivatives or other natural materials derived from renewable sources are preferred for the second component. The most preferred choices for the second component are soybean oil and its derivatives (e.g., epoxidized soybean oil), biodiesel, glycerol and the like.

The compositions according to the invention, before being energy-activated, can be characterized as liquid emulsions, dispersions and/or suspensions in which the first component and any other optional additional solids or liquids, are emulsified, dispersed or suspended as distinct or composite particles in the second component. Alternatively, the optional liquid or solid components can be soluble in the second component. For example, solid tackifiers and soybean oil can be combined in various ratios to create a higher proportion of liquid carrier and lower viscosity liquid polymer compositions. These optional components can also include thermoset polymers, natural by-products such as lignin derivatives, intractable animal and plant proteins, initiators, curing agents, cure accelerators, catalysts, crosslinking agents, tackifiers, plasticizers, dyes, flame retardants, coupling agents, pigments, impact modifiers, flow control agents, foaming agents, fillers, glass treated and untreated microspheres, inorganic and organic polymer microparticles, other particles including electrically conductive particles, thermally conductive particles, synthetic, plant and animal fibers, antistatic agents, antioxidants, and UV absorbers, biocides, rheology modifiers, film formers, tackifying resin dispersions, soluble tackfiers and their derivatives.

Thus, compositions according to the invention can exist in four different states, depending upon conditions:
 (i) a liquid emulsion, dispersion or suspension when stored at temperatures from about 32° F. up to about 140° F.;
 (ii) a substantially homogeneous, fused molten blend when first heated above about 140° F. (and more preferably above about 212° F.) and mixed;
 (iii) a substantially homogeneous, fused molten blend capable of being applied directly or expanded with the aid of a blowing agent when dispensed above about 140° F. (and more preferably above about 212° F.); and
 (iv) a thermoplastic cellular or solid non-cellular polymeric solid material, which may be capable of bonding one or more substrates when the dispensed substantially homogeneous, fused molten blend cools to a temperature below about 140° F.

Ethylvinyl acetate polymers are advantageously used as the first component without the need for an activating agent such as sebacic acid to absorb the second component during processing. A fused homogenous blend comprising such polymers exhibits excellent bonding to a broad range of substrates upon cooling to a temperature below about 140° F. This avoidance of sebacic acid and other diacids is advantageous because such materials can lead to deleterious wear on metal parts, especially at temperatures greater than 140° F.

In another embodiment of the invention, combinations of high levels of low surface energy, unreactive homopolymers that are not normally considered adhesives by themselves, such as polypropylene or polyethylene homopolymers, are used in combination with ethylvinylacetate polymers to create room temperature-pumpable compositions that do not need activators such as sebacic acid. The amount of polypropylene preferably comprises up to about 40% by weight of the total composition, and more preferably less than about 30% by weight and most preferably less than about 20% by weight of the total composition. The amount of polyethylene preferably comprises up to about 20% by weight of the total composition, and more preferably less than about 15% by weight and most preferably less than about 10% by weight of the total composition. It is possible to produce room temperature-pumpable compositions according to the invention that have viscosities less than about 25,000 cps, preferably less than about 20,000 cps and most preferably less than 15,000 cps.

C. Processing Aids

1. Reactive Blowing Agents

It is known that volatile, condensable and non-condensable, non-reactive materials, for example, nitrogen, fluorocarbons, hydrocarbons, carbon dioxide, and the like, can be used as processing aids that act as blowing agents to create gaseous voids in liquid and solid polymers used to bond substrates without the complexity associated with changing the compositional structure of the resulting matrix. In rapid, high efficiency systems, it is virtually impossible to use reactive blowing agents as foaming agents in the heated pot and hoses for conventional hot melt type systems due to the prolonged heating and the impact the reactive chemical has on the polymer system and potential for unwanted foam debris and waste in the system. In low temperature, slow systems, only materials that are extremely volatile or gases at room temperature can be used in systems such as cold glue systems due to the lack of thermal energy necessary to volatilize the processing aid sufficiently to create gaseous voids in liquid and solid polymers used to bond substrates.

In one embodiment of the present invention, compositions according to the invention comprise a processing aid that is a different material than the first and the second component and which is capable of facilitating chemical reactions with the first component, the second component and/or an optional component, and can simultaneously serve as a blowing agent. For example, rather than using a chemical blowing agent such as azobisdicarbonamide to produce non-reactive nitrogen gas, small amounts of reactive blowing agents, such as water, can be incorporated into compositions according to the invention that comprise, for example, ethylenevinylacetate copolymers, maleated polypropylene, polypropylene and polyethylene emulsified, dispersed and suspended in soy bean oil. When such compositions are heated and mixed at temperatures greater than 212° F., the water boils and forms water vapor, which performs the multiple functions of blowing agent, reactant and curing agent (i.e., water can facilitate anhydride ring-opening, esterification or condensation reaction products). The use of a reactive blowing agent improves the properties of the resulting finished, foamed solid material.

Delivery of the reactive blowing agent may take a number of forms. In one embodiment, it is directly added as the pure blowing agent to the liquid polymer composition in no particular order to get the desired density and fused polymer product properties. In another embodiment of the invention, the blowing agent may be introduced as an agent sequestered by another material. For example, starch nominally contains about 10% residual water and hydrated calcium sulfate has a reversible water of hydration that can be used in the foaming process. In another embodiment of the invention, the reactive blowing agent may be a by-product of one or more chemical reactions. For example, a methoxy silane can condense to liberate methanol and water or propylenecarbonate can decompose to liberate reactive propylene glycol and carbon dioxide. In another embodiment of the invention, the reactive blowing agent may function as a liquid carrier, for example water or solvent based paints and latexes.

The resulting foamed solid materials according to the invention exhibit performance that is equal to or greater than the performance of equivalent non-foamed compositions, but with density reductions at the point of dispensing the molten material ranging from 0.05 g/cc to 1 g/cc. Suitable reactive blowing agents for use in the invention include, for example, alcohols, diols, triols, water, amines, acids, anhydrides, acrylic acid, acrylonitrile, styrene, methylmethacrylate, ethylene carbonate, propylene carbonate, hydrated minerals, alkoxysilanes (mon-, di-, tri, and tetraalkoxy), hydrolyzed silanes (hydrolyzed alkoxysilane monomers, dimers or trimers), prehydrolized organosilanes oligomers, blocked isocyanates, hydrated inorganic compounds. The amount of reactive blowing agent used in the composition will vary depending upon the particular composition and material being used.

Water is the presently most preferred reactive blowing agent for use in the invention in view of its cost, lack of flammability, non-toxicity and performance characteristics. When water is used as a reactive blowing agent in a liquid polymer composition comprising ethylenevinylacetate copolymers and maleated polypropylene, the amount of water necessary to generate a foamed solid material is typically in the range of from about 0.05% to about 10% by weight, preferably 0.1% to about 5%, most preferably 0.2% to about 2%. The ratio of volume occupied after foaming to volume occupied before foaming ranges up to about 20:1, preferably up to about 10:1 and most preferably up to 5:1 by volume.

2. Process Hygiene Improvers

Unless otherwise stated, improvements in "process hygiene" refer to reductions in "stringing", which is a phenomenon characterized by "strings" of heated polymeric material extending between the tip of a dispenser and a substrate or mold into or onto which the molten polymeric material has been dispensed. Eliminating or decreasing the extent of stringing and thereby creating a substantially clean cut-off at the dispenser can reduce material waste and down time associated with the clean up of such strings.

In one embodiment of the present invention, the liquid polymer compositions according to the invention comprise a process aid comprising one or more low-molecular weight molecules typified as surfactants, which are capable of improving processing hygiene. A wide range of low-molecular ionic and non-ionic surfactants can be used as process aids with the scope of the present invention. It is contemplated that such surface active agents could be synthesized from silicones, hydrolysis products of cellulosics and their derivatives, hydrolysis products of starches and their derivatives including their hydrogenated derivatives, polyalkylene oxides, polyolefin, hydrocarbons, polyesters, polyanhydrides, polymerized olefinic materials and various combinations of derivatives, thereof. Additionally, ionic materials can include anions which can include sulfonates, phosphates, and the like and cations which can include quaternary ammonium salts, metal ions including mono- and multi-functional anions, sodium, potassium, calcium, zinc, and the like. For example, these materials can be combined to form low molecular weight linear structures such as AB's, ABA's, BAB's, where A is characterized as a hydrophobic mono- or difunctional material, B is characterized as a hydrophilic mono- or di-functional material. It is contemplated that the difunctional example above is for ease of illustration and can be extended to other more complex multi-branched possibilities. Non-limiting examples include nonaphenolethoxylate or hydrocarbon sulfonates, comb polymers such as non-hydrolyzable silicone polyalkylene oxide copolymers, branched and star structures such as sorbitan esters, sorbitan alkyleneoxide esters, and the like, and hydrolysable silicone polyalkylene oxide copolymers. The presence of low-molecular weight surfactants in compositions according to the invention improves processing hygiene without producing a stable foam or depressing adhesion characteristics. The inventors believe that low molecular weight surfactant compounds may also be advantageously used in conventional hot melt compositions for this purpose.

The amount of a low-molecular weight process aid used in the composition to improve processing hygiene will vary depending on the particular composition and material being used. When a non-ionic surfactant is used, the molecular weight is preferably less than 5,000, more preferably less than 4,000 and most preferably less than 3,000. When an ionic surfactant is used, the molecular weight is preferably less than 2,500, more preferably less than 2,000 and most preferably less than 1,500. The amount of processing aid used in the composition will vary depending on the particular composition and material being used. Quantities ranging from 0.1% to 18%, more preferably from 0.1% to 12% and most preferably from 0.1% to 6% are believed to be suitable.

3. Foam Stabilizers

In another embodiment of the invention, a processing aid is utilized to improve the stability of foam generated by a reactive foaming agent. Creating uniformly dispersed, stable cells from the gas voids created by adding a blowing agent to the molten expanding mass of this invention can lead to retention of heat to improve open time or work time, improvement of mileage or reduction of material used per application and improvement of insulation qualities associated with the uniform, closed cells. The challenges associated with creating uniform, stable cellular structures are exacerbated at the elevated temperatures of dispensing these dynamic polymeric systems, particularly where it is desirable to have the lowest possible viscosity for improved process hygiene.

A process aid formed by neutralizing sebacic acid with calcium carbonate can be added to compositions according to the invention to obtain fine, stable cell structures in the molten, fused material after dispensing. Similar compounds according to the formula $(AB)_n$, where A is a repeating unit characterized as a hydrophobic difunctional material, B is a repeating unit characterized as a hydrophilic difunctional material and n is a number greater than 25, would likely produce similar results. In the case of the ionic, high molecular weight surfactant produced from sebacic acid and calcium carbonate, A in the formula $(AB)_n$ would be sebacate with a charge of $^{-2}$, B would be calcium with a charge of $^{+2}$ and $_n$ would be a number greater than 25. In the case of a nonionic, high molecular weight surfactant produced from a Si—H terminated difunctional siloxane polymer hydrosilated with an allyl terminated polyalkyleneoxide polymer, in the formula $(AB)_n$, A would be a siloxane polymer and B would be a polyalkylene oxide polymer and $_n$ would be a number greater than 25. The discovery unexpectedly showed that low molecular weight surfactants did not impart the same cell structure stabilizing effect as high molecular weight surfactants, for example polyalkylene oxide copolymers of ethylene and propylene oxide, silicone surfactants used to stabilize polyurethane froth and conventional foam and the like.

The amount of high-molecular weight surfactant used in the composition will vary depending on the particular composition and material being used. Quantities ranging from 0.05% to 18%, more preferably from 0.1% to 12% and most preferably from 0.1% to 6% are generally considered to be suitable. The molecular weight of non-ionic surfactant used to stabilize foam is greater than about 5,000, more preferably greater than about 7,500 and most preferably greater than about 10,000. The molecular weight of the ionic surfactant used to stabilize foam is greater than about 2,500, more preferably greater than about 5,000 and most preferably greater than about 7,500.

4. Bond Time Reducers

Reducing bond time (i.e., the minimum time needed to hold two substrates together while allowing an adhesive disposed therebetween to substantially cure to serve its intended purpose) is highly desirable since it relates to faster line speeds, greater capital efficiency and increased ability to seal the substrates. A shorter bond time correlates with faster and more effective adhesives, sealants, coatings and gasketing materials. While not intending to be held to any particular theory, bond time is believed to be unique to liquid polymer compositions according to the invention since it is speculated that liquid polymer compositions do not crystallize or solidify like conventional hot melts and cold glues where measurements such as set, tack and open time are used to characterize the systems. Hot melts and cold glues have a set time where the process is generally finished as it is postulated that the material crystallizes or dries thereby having a material that is set and can be handled for the intended process. This set time is characterized by the time where there is immediate fiber tear, i.e., the failure of the substrate vs. cohesive failure of the adhesive, sealant, coating or gasketing material. As time goes on, any further annealing of the structure in hot melt and cold glues can lead to the substrate releasing either cohesively, adhesively or both. The specificity of this performance often requires formulating different products for low and high environmental conditions, which include temperature, humidity, and exposure to chemicals such as oil, solvents and the like. The liquid polymer compositions of this invention are unique as they actually continue to build strength and performance as time passes, especially in those situations where there are oils, plasticizers or soluble chemicals in the substrate that would impair hot melt performance and, particularly, in those cases where one formulation is needed for low to high temperature.

It was discovered that latex paint, when used as a processing aid, led to reducing the bond time and improving the quality of the cellular structure of the substantially homogeneous, fused, molten material upon dispensing. While not being bound to any particular theory, it hypothesized that the latex paint contains a number of compounds previously identified as processing aids herein, including, but not limited to: (1) a reactive blowing agent in the form of water; and (2) surfactants and emulsifiers that help produce uniform, stabilized cellular, fused, molten material. Latex paint compositions also typically comprise "leveling agents", which may explain why the dispensed fused molten mass of compositions according to the invention containing latex paint have the appearance of spreading out, which increases the total surface area of the molten mass contacting the substrate thereby improving adhesion and bond time. This novel result could also be a result of one or a synergistic combination of two or more other components of latex paint, which function as rheology modifies, film formers, dispersants and the like. Latex paint can be added up to about 20% by weight of the total composition, more preferably less than about 15% and most preferably less than 5% by weight of the composition depending on the total contained solids, form of the carrier and general reactivity of the contents in the paint to get the desired effect of improved bond time and uniform, stable, low density cellular foam.

The specific composition of latex paint varies by manufacturer and brand. Bond time reductions were obtained through the use of several different latex paint brands. Of the brands tested, Behr Ultra Pure White No. 1050 Acrylic Latex Paint produced the best bond time reductions. ICI ULTRA™ Velvet Sheen White Latex and Sherwin-Williams DURATION® Extra White Latex also provided bond time reductions, but not to the extent of the Behr product. The exact composition of these latex paint formulations is proprietary to the manufacturers. The inventors suspect that one or a combination of two or more components typically found in latex paint formulations will ultimately be identified as being primarily responsible for the improvements in bond time. Such compounds are likely to include water and one or more of the following: 2-ethylhexyl benzoate or similar compound; ethylene glycol; aluminum hydroxide; titanium dioxide; kaolin; calcium carbonate; silica and/or silicates; acrylic polymers and copolymers; latex; and/or ester/alcohol film formers.

5. Viscosity-Bond Time Reducers

Lowering the viscosity of the composition in its pre-processed low-temperature state is desirable as it allows the material to be delivered by gravity, pneumatics, peristaltic pumps, gear pumps, piston pumps and the like. It was believed adding particles that were less than 100 micron average particle size would aid in attaining this desired positive effect on maintaining and/or reducing viscosity.

In Example 10 below, the emulsion polymerized ethylene vinyl acetate ("EVA") polymer (MICROTHENE® FE532) which was generally used in other examples to maintain lower viscosities at higher solids when used in combination with ground EVA's could be replaced by polymer polyols and latexes to give similar viscosities at similar solids levels. Surprisingly, adding these polymer polyols and latexes led to improved bond times, lower temperature bond times and/or higher dispensing weights versus emulsion polymerized ethylene vinyl acetate polymer (MICROTHENE® FE532). It is believed that the higher dispensed weights correlate to improved hygiene and/or less stringing.

The breadth of this discovery ranged from dispersions and emulsions ranging from 100% to approximately 20% total solids. An example of a processing aid that would be considered 100% solids in this invention are dispersions known as polymer polyols, styrene, and acrylonitrile monomers polymerized in a polyalkylene oxide polyol to form a solid styrene-acrylonitrile polymer dispersion in polyalkylene oxide polyol as the carrier. Latexes are examples of emulsions that are characterized more in the range of 25-75% total solids. Latexes are formed in a carrier that would be considered a reactive blowing agent (water) and consist of polymers formed from polymerizing monomers such as acrylic acid, vinyl acetate, acrylate ester and/or the like to form dispersion and/or emulsions in water at 25-60% total solids product. A third example of small particle materials that demonstrate the breadth of the invention and would be considered 100% total solids are fine particles of inorganics. The less than 100 micron average particle size processing aids could be added up to about 20% by weight of the total composition, more preferably less than about 15% and most preferably less than about 5% by weight of the composition depending on the total contained solids in the additive, the form of the carrier and general reactivity of the contents.

D. Sustainable Products

Improving the amount of sustainable, bio-based, recyclable natural products (hereinafter sometimes referred to as "sustainable products") is a desirable goal for environmental reasons. Carbohydrate products such as cellulosics and starches and their derivatives are widely used in cold glues, i.e., those glues that are cured at ambient temperatures or in low temperature (e.g., <90° F.) processes. These ingredients are generally not thought of as additives or used in high energy environments due to the caramelization and decomposition chemistries that accompany the use of these materials at higher temperatures. It was surprisingly found that adding these types of materials gave pumpable liquid compositions that had extremely low viscosities and extended the lower temperature application range that the liquid polymer compositions could be processed to a substantially homogeneous, fused molten mass useful in bonding or coating one or more substrates to above the point of boiling water, more preferably above the temperature of 225° F., and most preferably above 280° F. Products such as starches and their derivative, celluloses and their derivatives, for example polydextrose, hydroxyethylated cellulose, lignins and their derivatives, propoxylated starch, hydrogenated starch hydroylzate, dextrins, corn syrup solids, maltodextrins, and the like, can be used up to 40%, most preferably less than 20% and most preferably less than 15%. It is most preferred to use materials where the reactivity of the residual aldehydes has been reduced.

Thus, the invention facilitates the production of sustainable compositions made from bio-based, sustainable materials in quantities greater than 40% by weight, preferably greater than 60% or 80% by weight and most preferably from about 90% to 100% by weight, using as components for the composition, for example, starches and their derivatives, cellulosic materials and their derivatives, animal and plant proteins and their derivatives, animal and plant fats and oils and their derivatives, and the like.

The sustainable composition is comprised of a first component in an amount from 30% to 80% by weight, preferably from 40% to 80% by weight and most preferably from 40% to 70% by weight, wherein the first component is a natural product in a sustainable solid phase that is suspended, dispersed, emulsified or solubilized in the second liquid phase component and which is capable of irreversibly reacting and/or absorbing the liquid phase at temperatures above 140° F. to form a substantially homogeneous, fused solid composition. For example, it has been shown that starch (solid phase material) and glycerol (liquid phase material) can be formed into a dispersion at room temperature, with the starch irreversibly retaining the majority of the liquid carrier subsequent to being heated to a temperature greater than 140° F. The examples surprisingly show that high levels of hydrophilic sustainable polymers can be used in a hydrophobic environment where the liquid phase is hydrophobic soy bean oil and yet the composition still results in good adhesion with no exudation. The authors anticipate using vegetable and animal proteins, starches, cellulosics, lignins, preferably vegetable and animal proteins, to formulate to high strength polymers that comprise greater than 80%, and most preferably 100%, sustainable products, resulting in finished products such as adhesive, sealants, coatings and gaskets.

The composition is comprised of a second component, from about 20% to 70%, preferably 20% to 60% and most preferably 30% to 60% of a natural product or combination of natural products as a sustainable liquid carrier that is liquid at temperatures below 140° F., for example glycerol derived from the biodiesel process or the cracking process of the starch derivatives sorbitol, 1,3 propane diol derived from genetically modified organisms processing of starch derivatives, or vegetable oils, for example soy bean oil, or animal biodiesel derived from the biodiesel process with animal fats, or animal fats like fish oil, and the like natural processes and products. The boiling point of the liquid should be greater than 140° F., preferably greater than 212° F. and most preferably greater than 250° F. Balancing the ratio of these hydrophilic and hydrophobic carriers play a key role in establishing the choice of the first polymer component and the ability to develop compositions of greater than 80% sustainable compositions that perform according to the requirements of the specified application of an adhesive, sealant, coating or gasketing material.

Water can be advantageously used as environmentally friendly, sustainable, co-carrier liquid with the sustainable liquid carrier at less than 20% by weight of the composition, preferably less than 15% by weight and most preferably less than 10% by weight. And, as noted above, at a temperature above 212° F., water can simultaneously serve as a reactive blowing agent.

Optionally, processing aids which are the subject of this invention or optional components described here within can be added and remain within the scope of this aspect of the invention. For example, it can be desirable to add biocides and preservatives in this particular invention since the composition will be considered bioactive, especially in humid conditions or those situations where the water activity is high.

The sustainable composition can be subjected to the processing conditions specified here within with advantages over both the cold glues and hot melts. Cold glues are often produced from higher levels of sustainable materials such as starch, dextrins, cellulosics, animal proteins, and the like, suspended, dispersed, emulsified or solubilized in water or other volatile carriers that allow the solids to cure over a period of time. These products are described as cold glues because they must be applied at low temperatures where the natural products do not decompose and the volatile components must be allowed to evaporate leading to slower bonding and cure, lower efficiencies and slower cycle times as compared to equivalent hot melt systems. Hot melt systems are generally much faster but suffer from the deficiency of demanding high levels of fossil fuel derivatives, for example ethylene vinyl acetate, polyethylene, polypropylene, waxes, polyurethanes, polyamide, and the like, and the need to be applied at high temperatures. The sustainable compositions disclosed herein can be processed at temperatures between about 140° F. and about 350° F., more preferably between about 212° F. and about 320° F. and most preferably between about 225° F. and about 300° F. and maintain the performance advantages of cold glue and the efficiency of hot melts.

E. Processing Equipment

In order for a liquid polymer composition of the present invention to be utilized as an adhesive, sealant, coating or gasketing material, the composition must be fed through a device that consistently energizes and activates the liquid polymer composition to a state where it becomes a substantially homogeneous, fused molten material. Conventional hot melt processing equipment suffers from several limitations, which include batch heating in open tanks, heated hoses, no apparatus to thermally break the room temperature and heated sections, and no apparatus to mix and blend the liquid polymer composition to obtain the homogeneous fused material, limited capacity per unit time, plugging of the lines and inability to cope with internally introduced blowing agents. The present invention provides devices and combinations of devices that enable the liquid polymer compositions according to the invention to be energized, mixed and dispensed in a manner that overcomes the deficiencies of the prior art. The combinations thereby allow the liquid polymer compositions to be commercially delivered on demand and heated and processed at higher capacities and without the issues of hose plugging or pump pack outs, which sometimes plague conventional hot melt processing systems.

FIG. 1 shows one exemplary configuration of a system 10 for activating and dispensing a liquid polymer composition according to the invention. The system 10 includes a high capacity reactor 20, an insulator device 30, which can be used in place of prior art thermal dissipaters, a pressurized supply source of the liquid polymer compositions 40, hereinafter called a vessel, and a dispensing unit 50 (e.g., a dispenser gun). While FIG. 1 illustrates a manual dispensing unit, the invention contemplates other manual and automatic dispensing units known in the art. In other configurations, a mechanical check valve 60 is used (not shown in FIG. 1).

1. Reactor

With reference to FIGS. 4-7, the reactor 20 according to the invention maximizes the volume of the energized and mixed liquid polymer composition held resident in the reactor at the dispensing temperature and the degree to which the material is mixed, which increases the amount of the composition that can be dispensed per unit of time. This results in maximum capacity for systems that deliver a material to the point of activation that is juxtaposed to the point of dispensing and application. Thus, the present invention provides a device that simultaneously performs the following functions: (1) it energizes an incoming pumpable composition to an activated dispensing condition; (2) it statically mixes the composition; (3) it maximizes the volume and mixing of the composition held in an activated condition.

The reactor according to the invention maximizes the ratio of liquid polymer composition to the mass and size of the device, the exposure of energy source to the liquid polymer composition and mixing. A primary construct of the new design is to use a helix to maximize the surface contact of the liquid polymer with the energy transfer surface. While not being bound to any particular theory, it is believed that the centrifugal force associated with the flow of the material in the helix will have the lowest viscosity material closest to the heater flow differentially from the heated surface to the other surface; thereby, simultaneously mixing the material and dramatically increasing the capacity for melting and mixing the liquid polymer compositions in the reactor.

In a most preferred embodiment of the helix design, the present invention provides a device comprising an internally heated reactor that includes a plurality of interconnected channels that provide pathways through which a pumpable composition must flow circumferentially in at least one path, preferably two paths, to the next level where it again encounters each of the next channels until it exits the reactor. In the case where each opening between the channels alternates 180°, the material splits and has the effect of folding the material in on itself each time it passes through a channel. The channels are preferably defined by an interconnected series of at least one groove that are provided between an outer cylindrical sidewall of a core element and the inner sidewall of an outer tubular member that is adapted to slide over the core element. This design is unique in that it can minimize the reactor parts to two sections while accomplishing the work of more complex multi-component heat exchanger and mixer combinations.

The materials of construction for the reactor helix design are chosen based on the demands of the application, for example temperatures, pressures, chemical compositions. For high energy sources such as ultraviolet light, microwave, thermal energy or the like, the material of construction transferring the energy to the liquid polymer composition should be substantially transparent to the energy source to insure the maximum transfer of energy to the liquid polymer composition, for example quartz transfers x-rays and ultraviolet energy, glass transfers visible light energy, some plastics transfer micro-wave energy, and the like. For thermal processes it would be desirable to use transparent materials that are highly conductive such as steel, aluminum, copper, brass, or the like. It is most desirable to use metals that can simultaneously accept the elevated temperatures from the heat source, the elevated pressure, have a high conductivity and be light weight such as aluminum.

The shell or surface not involved in energy transfer process can be made of the same or different materials from the device involved in transferring the energy to the liquid polymer system. The choice depends on the demands of temperatures, pressures, chemical compositions and need to isolate the energy transfer and energy source in the apparatus. In some cases, it would be desirable to have this material insure that all the energy is captured in the liquid polymer material, such as metal reflective surface in the case of ultraviolet and visible light and low conductivity insulating materials such as engineered plastics like polyetheretherketone, ceramics, and metals like stainless steel in the case of conductively heated systems. The preferred choices would be engineered plastics, ceramics, stainless steel and aluminum in the conductively heated systems.

The energy source can be applied at the outer or inner surface of the reactor depending on the constraints of the system which include viable configurations for the energy source, space requirements and cost constraints. As an example, there are high energy lamps or sheet heaters that could be applied to the outer surface or insert radiant lamps, cartridge heaters, or combinations thereof that could be applied to the inside surface, the preferred choice is to have the energy source placed internally to maximize the energy efficiency of the reactor.

In another embodiment of the invention, the energy source emits UV radiation, which can be used to activate compositions according to the invention and also conventional hot melt and cold glues. The energy source that emits UV radiation could be disposed axially within the core element, provided the core element was fabricated from a material that permitted transmission of UV radiation to the composition flowing through the circumferential groove. Alternatively, the energy source that emits UV radiation could be disposed on an outer side of the core element to transmit UV radiation to the composition flowing through the circumferential groove.

The inlet side of the reactor attached to the delivery system may optionally be attached to an insulator or heat dissipater to prevent the energy from the reactor migrating from the reactor to the delivery device thereby activating the incoming material. If the materials are sufficiently stable to energy transfer back to the delivery system, the hose, tubing or transfer device may suffice to act as the insulator, for example the hydraulic hose which is constructed of sufficiently low thermal conductivity rubber can act as an insulator. The outlet side of the reactor is attached to a dispensing device capable of controlling the amount of material to be delivered to the application.

Figure 4:
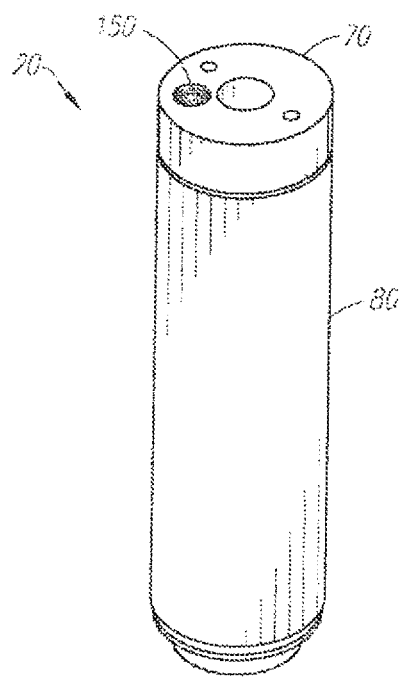
FIG. 4 is a perspective view of an assembled reactor according to the invention.
Figure 5:
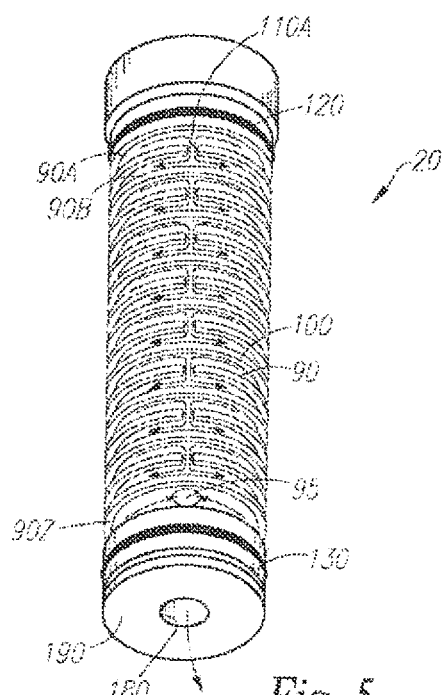
FIG. 5 is a perspective view of the reactor shown in FIG. 4, with the outer tubular member removed to show the core element.

FIGS. 4-6 show various views of the presently most preferred embodiment of the helix reactor design. The reactor 20 comprises a core element 70 and an outer tubular member 80 that is adapted to slide over the core element 70. The core element 70 can be formed of aluminum, stainless steel, copper, or other material that is capable of rapidly transferring energy and is compatible with the pumpable composition. The outer tubular member 80 can also be formed of aluminum, stainless steel, copper or other material that is capable of withstanding heat and high pressures. It is also possible to form the outer tubular member 80 from ceramics, engineered plastics or other materials that prevent heat loss from the core element 70.

The core element used in the accompanying examples was machined from solid aluminum cylindrical stock having a length of about 5.0 inches and a diameter of about 1.5 inches. It will be appreciated that other lengths and diameters can be utilized. The solid cylindrical stock is machined to provide an outer cylindrical sidewall having a diameter of about 1.25 inches. A plurality of grooves 90 are provided in the outer cylindrical sidewall of the core element 70. The grooves 90 can be cut into the core element 70 using a lathe. Alternatively the core element 70 can be cast or otherwise formed with grooves 90 using other fabrication means. In the embodiment of the invention used in the accompanying examples, twenty-three (23) grooves were formed in the core element 70. It will be appreciated that the number of grooves 90 is not per se critical, and that a greater or lesser number of grooves 90 can be used, as appropriate.

In the core element utilized in the accompanying examples, each groove 90 had a depth of about 0.250 inches and a width of 0.084 inches and was spaced apart from each other groove 90 a distance of about 0.050 inches. The uncut space in the cylindrical sidewall of the core element 70 between adjacent grooves 90 can be considered as a fin 100. The depth and width of the grooves 90 and the fins 100 can be adjusted for various compositions, flow rates, back pressure needs, and the like.

With particular reference to FIG. 5, each groove 90 is interconnected to each adjacent groove 90 by a notch 110. Additional notches and notch configurations are possible depending on the flow rates, back pressure demands and degree of mixing needed. The minimum number of notches has to be one. Each notch 110 can have the same width and depth as each groove 90. In the core element 70 used in the accompanying examples, the notches 110 had a width of 0.125 inches and a depth of 0.200 inches. Preferably, the notches 110 connecting sequential grooves 90 are disposed about 180° from each other in an alternative manner. It will be appreciated that the depth and width of the grooves 90 and notches 110 can be adjusted to provide the optimal heating, mixing and instantaneous capacity for the composition to be processed in a given application.

As noted above, the outer tubular member 80 slides over the core element 70 thereby covering the grooves 90 and notches 110. An upper O-ring 120 and a lower O-ring 130 provide a fluid-tight seal between the outer tubular member 80 and the core element 70. The inner diameter of the outer tubular member 80 used in the accompanying examples was 1.26 inches, which allowed the outer tubular member 80 to barely slide over the fins 100 of the core element 70 and thereby form a substantially fluid-tight seal between the fins 100 and the inner side of the outer tubular member 80. Thus, the inner side of the outer tubular member 80 and the grooves 90 and notches 110 in the core element 70 cooperate to define a series of interconnected circumferential fluid flow channels (Note the flow-arrows in FIG. 5). A snap ring 140 or other locking device can be used to secure the outer tubular member 80 to the core element 70.

With reference to FIG. 6, a pumpable composition is pumped from the supply source 40, preferably through an intermediate thermal dissipater or insulator 30, through an inlet 150 formed in an inlet end 160 of the core element 70. The inlet 150 is in fluid communication with the first groove 90a on a side opposite the first notch 110a. In the core element used in the accompanying examples, the inlet 150 comprised a 0.400 inch deep flat bottom hole that was threaded to receive a ⅛ inch NPT male fitting, and which further included a 0375 inch hole drilled an additional 0.875" to reach the first groove 90a in the core element. Thus, the pumpable composition flows into the first groove 90A, where it divides into two streams, each of which flows in an opposite direction around the circumference of the core element 70 to reach the first notch 110a. At that point, the two streams of material converge and combine as they flow through the first notch and then separate again and flow in opposite directions around the circumference of the core element 70 in the second groove 90b, where they converge and combine again at the second notch (disposed 180° from the first notch 110a). This dividing and re-combining of streams is repeated through each successive groove 90 and notch 110 until the material reaches the last groove 90z. By this point, the pumpable composition is in a heated, substantially homogeneous state ready to be dispensed. The material exits the core element 70 through an outlet fitting 170 (see FIG. 1), which is received in an axial bore 180 formed in the outlet end 190 of the core element 70, which is in fluid communication with the last groove 90z through a hole 95 drilled to the center core. A dispensing unit 50 is connected to the outlet fitting 170. In the device used in the examples, the axial bore 180 was about 0.830 inches deep and includes threads for engaging a ¼ inch NPT fitting. It will be appreciated the inlet 150 and outlet 180 location, type and size is not per se critical, and that these choices are a function of the requirements of the particular structure of the devices attached to the apparatus.

FIG. 7 shows an alternative embodiment in which the grooves 90 are formed spirally in the core element 70. In this embodiment, no notches are needed inasmuch as the grooves 90 form a single pathway from the inlet end 150 to the outlet end 190. The embodiment illustrated in FIG. 7 does not produce as efficient of mixing per unit space as that which is illustrated in FIG. 6, but may be favorable for compositions that have low back pressure requirements, require less mixing or have little space requirements so that an optional mixer can be attached to the exit of the reactor.

Heat is supplied to the core element 70 by a heating cartridge 200 (e.g., a 500 Watt heater), which is adapted to fit into an axial opening 210 that extends longitudinally through the inlet end 160 of the core element 70. In the embodiment utilized in the examples, the axial opening 210 had a diameter of 0.500 inches and a depth of 3.5 inches. The heating cartridge 200 heats the entire tubular core 70 of the heat exchanger from the inside.

In an alternative embodiment a cartridge heater that has varying watt densities can be assembled into the axial opening 210 that extend longitudinally through the inlet end 160 of the core element 70. The upstream or inlet portion (approximately 35-50% of the available cartridge length) of the cartridge heater will supply 60-85% of the available heat. The higher watt density at the upstream section of the reactor provides more direct heat to the incoming portion of the heater body that is in contact with the room temperature material thus providing a quicker heating section to bring the room temperature composition up to melt temperatures. The downstream portion of the fluid passages and heater body is indirectly heated to a lesser level by conduction from the upstream portion and the lower watt density at the output section of the heater cartridge. In a most preferred embodiment the electric heating element in the body directly heats only the upstream portion of the fluid passages and heater body. The cartridge heater can be 25%-70% as long as the reactor length thus providing the majority of localized heat to the area of the reactor containing the material that is being heated to the molten state. The downstream portion of the fluid passages and heater body is indirectly heated to a lesser level by conduction from the upstream portion. The downstream portion acts as a thermal accumulator which damps overshoot and undershoot of the fluid temperature at the outlet port. It will be appreciated that alternative energy sources could be disposed within the axial opening 210 and/or that the heating source could be disposed circumferentially around the outer tubular member 80.

An over temperature safety device 220 is also adapted to be inserted into a bore 230 in the inlet end 160 of the core element 70. The over temperature safety device 220, which cuts off power to the heating cartridge 200 if the temperature exceeds a predetermined maximum temperature. In the embodiment utilized in the examples, the bore 230 was a tapped 6-32 threaded bore, which was 0.375 inches in depth. It can be appreciated that this device is not critical to the invention and is added only as an added safety device.

The inlet end 160 of the core element 70 also preferably includes a bore 240 for receiving a resistance temperature detector (RTD) 250 that measures the temperature of the core element 70. The RTD 250 communicates with a temperature controller (not shown), which supplies power to the heating cartridge 200, as necessary to maintain the desired temperature. In the embodiment utilized in the examples, the bore 240 had a diameter of 0.126 inches and a depth of 0.600 inches. This sensing device could optionally be any suitable device for controlling the energy supply to the reactor.

The reactor 20 is preferably covered by a layer of thermal insulation, which itself can be covered by an outer cover. The insulation and outer cover prevent unwanted heat loss from the reactor 20 and protect users from high temperatures within the reactor 20. The amount and type of insulation is a function of the transfer of energy across the outer tubular member 80, for example if the tubular member 80 was produced from a non-conductive engineering plastic there might not need to be any additional insulating material or if the energy source was a light activated system, there would be no need for any heat insulation.

Whether operated continuously or intermittently, the reactor device can provide a consistent flow of energized, substantially homogeneous material to dispensing equipment at a flow rate from about 1 gram/minute to about 15,000 gram/minute, preferably 2 gram/minute to about 10,000 gram/minute, most preferably 5 gram/minute to about 5,000 gram/minute at a pressure of from about 25 psi to about 3,000 psi, preferably 40 psi to 2,000 psi and most preferably 50 psi to 1,500 psi and a temperature of 140° F. to 500° F., preferably 212° F. to 400° F. and most preferably 250° F. to 380° F. Variations can be made in the arrangement of the parts in the heat exchanger assembly without departing from the scope of the invention so long as the apparatus maintains the proper temperature and mixing when it is in the heat exchanger assembly.

2. Insulator

Figure 2:
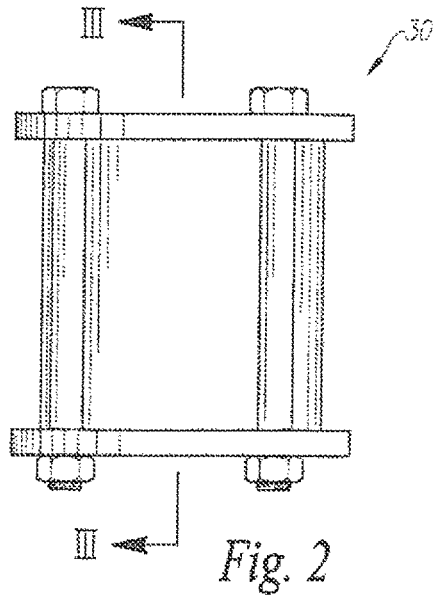
FIG. 2 is a side view of an exemplary insulator according to the invention.
Figure 3:
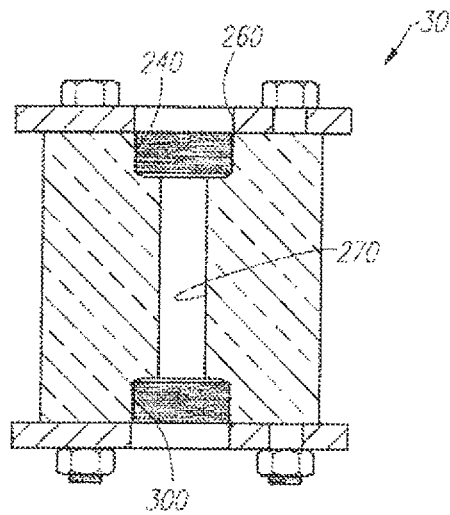
FIG. 3 is a side section view of the insulator shown in FIG. 2 taken along the lines III-III.

With reference to FIGS. 2 and 3, the insulator 30 is attached to the inlet end 160 of the reactor 20 and is employed to inhibit or stop the latent reactor energy from traversing backward towards the supply source 40. This allows for the liquid polymer composition to be fed to the reactor 20 and only be activated when it is in the reactor 20, thereby avoiding premature chemical and physiochemical interactions that could cause plugging, reduced flow and interruptions in the supply source 40. To accomplish this with an ultraviolet or visible light energy source, a blocking surface, for example a right angle bend made of light absorbing plastic or stainless steel could be used as insulator to eliminate the energy transfer to a light activated composition coming from the delivery system. To accomplish this with a thermal energy source, a thermally non-conductive material, for example a thermally nonconductive plastic or hose, is preferably utilized to eliminate or substantially minimize the transfer of heat back towards composition arriving from the supply source 40. The most preferred embodiment is an engineering plastic that has the advantage of thermal, pressure and thermal conductivity characteristics, for example polyetheretherketone (PEEK).

FIGS. 2 and 3 illustrate a thermal insulating device hereinafter sometimes called a thermal break. A pumpable composition is pumped to an inlet side 260 of the insulator 30 from a supply source 40. The supply source 40 could be a pressurized vessel as illustrated in FIG. 1, or simply a tube, hose or other supply device through which the liquid polymer compositions are supplied under pressure. The liquid polymer composition flows through an axial bore 270 in the insulator 30 and exits through an outlet port 280. As noted above, the particular engineering plastic is polyetheretherketone, which has a thermal conductivity of less than 3.0 BTU-in/hour-square foot-° F. (0.43 watt/meter-K) and a coefficient of linear thermal expansion of less than $1.2*10^{-5}$ in/in/° F. ($2.2*10^{-5}$ cm/cm/° C.). This thermal break can be used at pressure applications up to 3000 psi and temperature applications up to 450° F. The upper and lower female NPT threads 290 and 300, respectively, are adapted to accept male ⅛" inlet and outlet fittings. The fittings can be made out of any material suitable for the pressures, temperatures and chemical reactivity, but are most preferably of low thermal conductivity such as stainless steel. Optionally, male threads could be turned into the PEEK piece.

3. Delivery System

Preferably, a mechanical or dynamic one way check valve 310 is provided between the supply source 40 and the reactor 20 (an insulator, when utilized, is preferably disposed between the check valve 310 and the reactor 20). The check valve 310 allows the liquid polymer composition to only flow in the direction toward the reactor 20. This constant one-way flow of the liquid polymer composition avoids unwanted plugging of the supply source components 40, which can occur if the pressure is accidently, purposefully or otherwise relieved resulting in the activated material relaxing back into the delivery system and solidifying.

Figure 8:
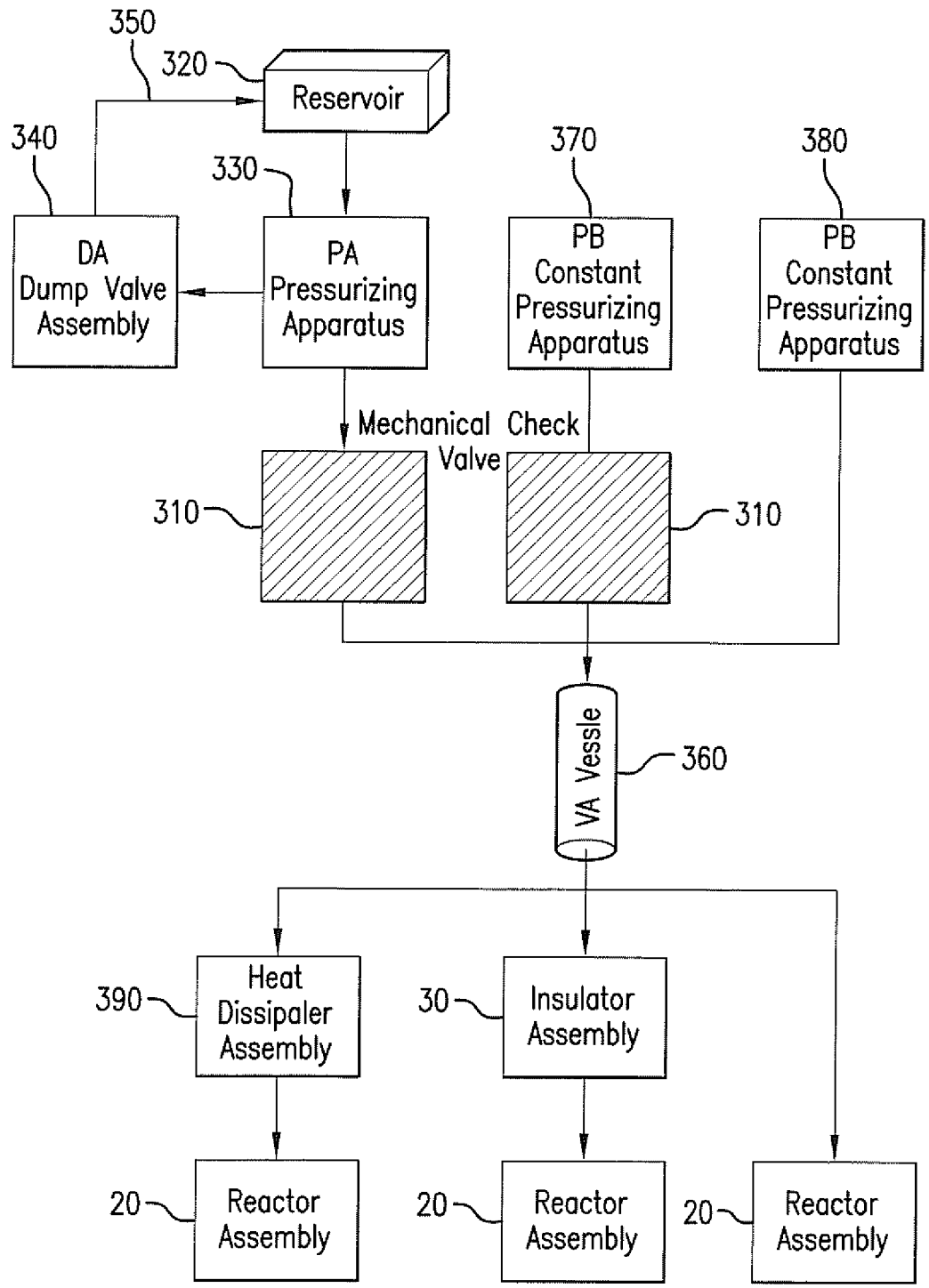
FIG. 8 is a flow chart slowing various configurations of components of the system according to the invention.

FIG. 8 is a schematic representation of various elements that can be utilized to deliver liquid polymer compositions to a reactor. In one embodiment, a reservoir 320 containing a liquid polymer composition flows through a pressurizing apparatus 330, to a mechanical check valve 310. The reservoir 320 could be a container, tank, rail car, or any storage or delivery system. The pressurizing apparatus 330 could be pneumatic, a pump or an air-driven piston, and the like. The dump valve 340 opens the valve and diverts the flow and pressure of the liquid polymer composition received from the pressurizing apparatus 330 through a feed-back loop 350 to the reservoir 320 when the system goes into set-back, a variable time condition related to the time that the movement of the liquid polymer composition is static and the period that pump can remain active and not result in a seized or packed pump due to separation of the carrier, hysteresis and/or heat buildup, and the like, for example when no material is being dispensed. In this case, the dump valve 340 is open and the check valve 310 remains closed maintaining a substantially constant pressure on the material on the outlet side of the check valve 310. When the system pressure on the outlet side of the check valve 310 is less than the inlet pressure, the check valve 310 opens, the dump valve 340 closes and allows material to pass through the check valve 310, for example when material is being dispensed.

In another embodiment of this invention, a restrictor can be used to replace the dump valve to allow the pressurizing device to retain a constant pressure, remain active and not result in a seized or packed pump due to separation of the carrier, hysteresis and/or heat buildup, and the like. The restrictor is a small diameter, preferably less than 3/16", preferably ⅛", and most preferably less than 3/32" inside diameter tubing of 100 feet, preferably less than 50 feet and most preferably less than 25 feet that is compatible with the temperatures, pressures, chemical composition and other criteria of the pressurized liquid polymer compositions. This restrictor can be used with the pressurizing system alone as a dynamic check valve or in combination with a mechanical check valve described above.

After passing through the check valve 310, the material passes through a vessel 360. The vessel 360 can be a tube, pipe, pressure pot or hose, and the like, capable of withstanding the working mechanical, pneumatic or hydraulic pressures, temperatures and chemical compositions, in the case of FIG. 1, 40 is a representative vessel. The vessel 360 could also be a small fitting between the check valve 310 and the next component in fluid communication therewith.

It will be appreciated that the liquid polymer compositions can be supplied to the vessel 360 using other pressure apparatus, with or without a check valve. FIG. 8 illustrates a constant pressure apparatus 370 providing the composition to the vessel 360 through an intermediate check valve 310. FIG. 8 also illustrates a constant pressure apparatus 380, which delivers the composition to the vessel 360 without the use of a check valve 310, for example a nitrogen cylinder or tank.

The pressure exerted on the pumpable composition can be generated mechanically, pneumatically or hydraulically, for instance a mechanically levered diaphragm, an air supply, bottled gas or a pump, including for example diaphragm, piston, gear pumps and the like, from 25 psi to 3,000 psi, preferably 40 psi to 2,000 psi and most preferably 50 psi to 1,500 psi. It is important that the pressure exceeds a backpressure generated by an internal blowing agent in the composition if the system is not fitted with a mechanical one way check-valve; that is, the constant mechanical, pneumatic or hydraulic pressure acts as a dynamic check valve in place of a mechanical check valve.

Most pressurizing apparatus lose pressure unless it is constantly being replenished, which makes the use of a mechanical check valve 310 the preferred embodiment of the invention. In the case of pumping systems where it is desirable to shutdown the pump apparatus to avoid unwanted hysteresis, relieve the pressure to avoid leakage or reduce wear, it has been found that the mechanical check valve apparatus is the preferred embodiment of the invention. In the case of some piston pumps, for example a Graco Fireball, 300 where maintaining this pressure for extended periods leads to pack out situations as the oil leaks out of the seals under pressure, a dump valve 340, for example a Dump Valve from Precision Pneumatics located in Lorain Ohio, is attached to the pressurizing apparatus. After a period of inactivity, preferably less than 1 hour and most preferably less than 30 minutes, the dump value 340 relieves the pressure by allowing the pumpable composition to return to the reservoir. A suitable check valve 310 for use in the invention is Check Valve Part # EDC30B from Detrol Fluid Products, which serves to maintain constant pressure as the pressurizing apparatus (e.g., a Graco Fireball 300) is no longer exerting pressure.

With reference to FIG. 8, the vessel 360 can be optionally fluidly connected to the reactor 20 through an intermediate heat dissipater assembly such as disclosed in the '583 patent 390, through an insulator 30 as described above or directly. In the most preferred embodiment of the invention, the vessel 360 is attached to an insulator 30, which is attached to a reactor 20.

4. Reactor/Dispenser Combination

Figure 9:
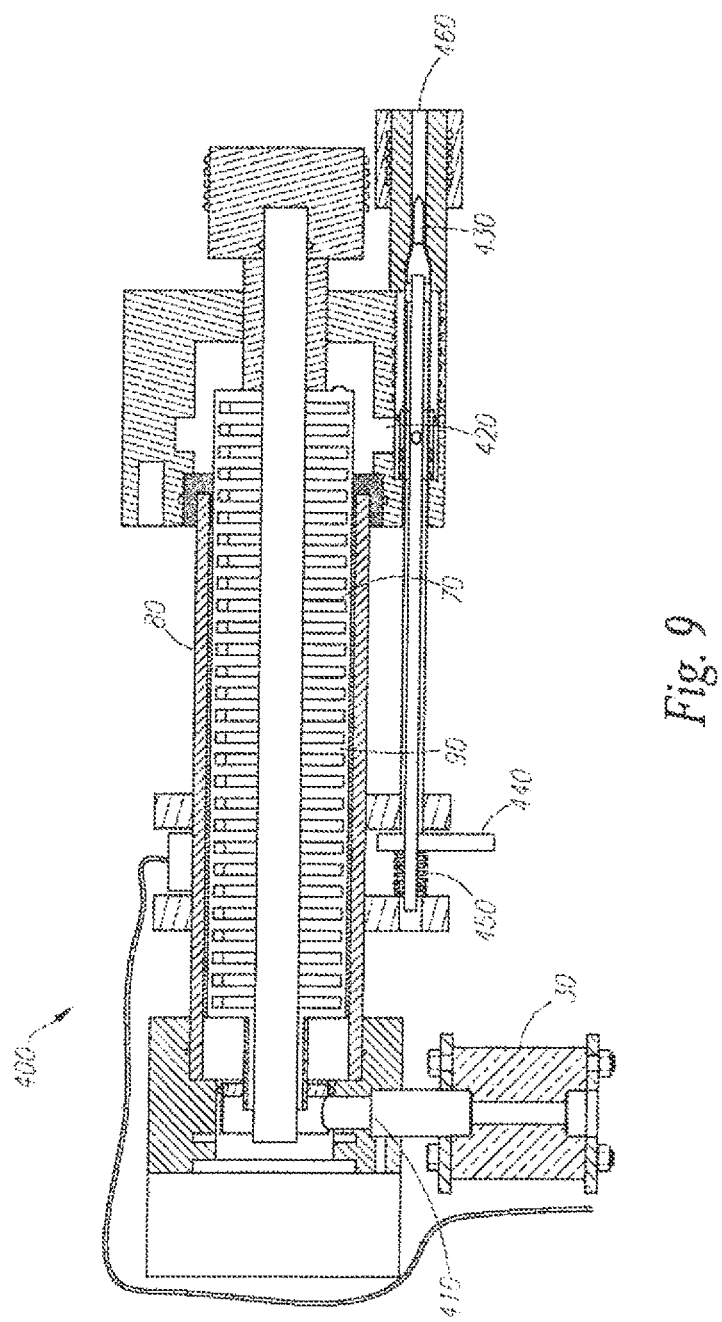
FIG. 9 is a side section view of an exemplary reactor/dispenser unit according to the invention.

FIG. 1 illustrates that the heated, activated composition can be dispensed through virtually any conventional hot melt or heated cold glue dispensing apparatus 50. FIG. 9 illustrates an alternative embodiment in which the reactor and dispensing apparatus comprise an integral unit 400, which can be coupled with an insulator 30 as described above.

Liquid polymer composition supplied under pressure from a supply source passes through the insulator 30 and enters an inlet 410 in the device 400. The inlet 410 is coupled to set of grooves 90, which are provided circumferentially in core element 70 as described above with respect to the reactor 20. The heated, activated composition exits through an outlet 420. The outlet 420 is in fluid communication with a needle valve 430, which is actuated by a trigger mechanism 440. When the trigger mechanism 440 is squeezed, a spring 450 is compressed and the needle valve 430 is withdrawn allowing the activated composition to flow through a nozzle 460. Upon releasing the trigger mechanism 440, the spring 450 biases the needle valve 430 back into a closed position, thereby causing the activated material to cease being dispensed from the nozzle 460. The advantages of this new design include the use of only one heated region to control in comparison to the prior art where the equipment consists of a preheated supply in the form of a heated hose, heat exchanger or the like and a separate heated device for dispensing in the form of a automatic module, manifold, gun, or the like, it can be designed to cost effectively simulate a zero cavity situation to eliminate unwanted stringing, it can be fit in extremely tight spaces and the only moving parts are extremely easy to maintain and replace with access from the outside of the dispensing nozzle 460.

The reactor 20 can include all of the elements previously described above, including a thermostat, an internal heating element, over-temperature safety devices and RTD elements. Trigger mechanism 440 can be operated by hand or through mechanical means coupled to computers through, for example, programmable logic controllers. The device 400 is extremely light in weight and can be utilized to deliver high volumes of material at very high flow rates continuously or intermittently, as needed for the particular application.

F. Methods and Products

The present invention also provides methods of making and using the compositions and devices disclosed herein, and products produced by such methods.

1. Method of Making Liquid Polymer Compositions

In a first method of the invention, solid particles comprising the first component are dispersed in the second component, which is a liquid material. The first component particles need to have a relatively small particle size, as heretofore described. The particles can be suspended, dispersed and/or emulsified in the liquid together with optional processing aids and/or other components. Alternatively, the processing aids and/or other components can be suspended, dispersed, emulsified or dissolved in the second component prior to the introduction of the first component.

2. Method of Activating Liquid Polymer Compositions

The present invention also provides a method of activating liquid polymer compositions according to the invention. According to the method, a liquid polymer composition is supplied to a reactor in a flowable liquid state at a temperature below about 140° F. The composition is heated and mixed in the reactor to a temperature at which it becomes a substantially homogenous, fused molten material. The composition exits the reactor and is dispensed. The dispensed composition can solidify to form an adhesive, a sealant, a coating or can solidify to form a gasket or other solid material.

3. Methods of Using the Composition

The present invention also provides a method of adhering a first substrate to a second substrate. In accordance with the method, a composition such as disclosed herein is thermally activated to form a substantially homogeneous molten blend. Then, the substantially homogeneous molten blend is disposed between the first substrate and the second substrate. This can best be accomplished using the devices disclosed herein. The substantially molten blend is retained between the first substrate and the second substrate for a bond time during which the molten blend cools to form the fused solid material that adheres the first substrate and the second substrate together.

The composition of the substrates is not per se critical. Excellent adhesion is obtained when at least one of the first substrate and the second substrate comprise cellulose fibers (e.g., paper, paperboard, cardboard, particle board, Kraft paper etc.). The fused solid material is capable of producing fiber-tear adhesion to substrates comprising cellulose fibers. Bond time is typically less than about four seconds.

It will be appreciated that structural adhesives according to the invention (e.g., thermosetting products) can be used to bond wood substrates together. In such applications, the bond strength improves when the composition further comprises a catalyst that catalyzes crosslinking reactions in the fused solid material upon exposure to moisture (e.g., atmospheric humidity). This is considered a latent cure because the crosslinking reaction is not catalyzed by thermal energy during processing, but rather upon exposure to moisture after the fused solid material has formed an initial bond.

The present invention also provides a method of forming a seal or gasket. In accordance with the method, a composition such as disclosed herein is thermally activated to form a substantially homogeneous molten blend. Then, the substantially homogeneous molten blend is dispensed onto a substrate. This can best be accomplished using the devices disclosed herein. The substantially molten blend is allowed to cool to form the fused solid material, which can function as a seal or a gasket. It will be appreciated that the cooling step can be accelerated by directing cooling air onto the dispensed substantially homogeneous blend.

4. Products

The invention also provides packages (e.g. cases and cartons) having one or more substrates (e.g., flaps) that have been bonded using the compositions. The invention also provides seals, coatings and gaskets formed using the compositions and methods of the invention.

The following examples are intended only to illustrate the invention and should not be construed as imposing limitations upon the claims.

EXAMPLES

The materials and abbreviations listed below are referenced in the following examples:

MICROTHENE® FE532 EVA [24937-78-8], 9% vinyl acetate, melt index=9, from Equistar; average particle size=20 microns with a particle size distribution 5-50 microns ATEVA® 1231; poly(ethylene-co-vinyl acetate), 12% VA, melt index 3, from Ateva ATEVA® 1820; poly(ethylene-co-vinyl acetate), 18% VA, melt index 3, from Ateva ATEVA® 2604; poly(ethylene-co-vinyl acetate), 26% VA, melt index 4, from Ateva ATEVA® 2830; poly(ethylene-co-vinyl acetate), 28% VA, melt index 150, from Ateva A-C925P maleated polypropylene, from A-C Performance Products, a division of Honeywell Corporation AC 1660 polypropylene, from A-C Performance Products, a division of Honeywell Corporation AC-8 polyethylene, from A-C Performance Products, a division of Honeywell Corporation Soy Bean Oil RBD (Refined, Bleached, Deodorized), from Archer Daniels Midland Company (ADM)

EASTOTAC™ H115 (grade R or W), hydrocarbon (hydrogenated resins) tackifier from Eastman Sebacic acid [111-20-6]

IRGANOX® HP 2225 or B900 antioxidant from Ciba

IRGAFOS® (Tris-(2,4-ditert-butylphenyl)phosphate) from Ciba

IRGANOX® 1010 (Pentaerythritol tetrakis(3-(3,5-di-tert-butyl-4-hydroxyphenyl)propionate)) from Ciba LACTONE™ HP 136 from Ciba IRGANOX® B900 antioxidant from Ciba Thermal Stabilizer System 2 components: IRGAFOS® 168 (Tris-(2,4-ditert-butylphenyl)phosphate) and IRGAFOS® 1076 (Octadecyl-3-(3,5-di-tert butyl, butyl-4-hydroxyphenol)-propionate)

Water

CELOGEN® 780, Blowing agent (Azodicarbonamide), from Chemtura

Methanol

Ethanol

Hexane

Mineral Oil, DRAKEOL® 35 from Penrico

EPOLENE® E43P maleated polypropylene from Westlake Chemical

Nanomer I-44, surface treated nano-sized montmorillonite from Nanocor

Ionic $(AB)_n$ material prepared by Liquamelt Corp. by reacting 1 mole of sebacic acid and 1 mole of $CaCO_3$, where the A=sebacic acid and B=Ca and n is a number greater than 25.

BIO-TERGE® AS-40, 50% Water 50% surfactant, (sodium olefin sulfonate (C14-16)) manufactured by Stepan Company TERGITOL™ 15-S-3 surfactant (nonophenolethoxylate) manufactured by The Dow Chemical Company CHEMSTAT® HTSA #22-20M (Erucamide) from PCC Cheman, Inc.

PLURONIC® F-127 surfactant (ethylene oxide and propylene oxide polymer) from BASF Unless otherwise stated, the term "paint" refers Behr ULTRA™ Pure White latex paint UCAR™ Latex 9189 from Dow Chemical Company ARCOL® Polyol HS-100 (Polymer Polyol) from Bayer Material Science STA-LITE® III and STA-LITE® IIIF, Polydextrose hydrogenated starches, Tate & Lyle STADEX® 82, Dextrin, partially hydrolyzed starches, Tate & Lyle 3M Microspheres S38, Glass Bubbles, 15-85 microns with crush strength 4000 psi, 3M Company HI-SIL™ T-700 Silica, Silica Thickener, synthetic amorphous silicon dioxide, PPG Industries, Inc.

INSTANT-LOK® 34-2635, Hot Melt Adhesive, National Adhesives

STADEX® 124, Dextrin, partially hydrolyzed starches, Tate & Lyle

HYSTAR® 3375, polyglycitol syrup, Corn Products International

SYLVATAC® RE 100L, rosin tackifier, Arizona Chemical

NuvPolymer 631-S, moisture cure adhesive, from NuvPolymers, Inc.

JEFFCAT® DMDEE 2,2'-dimorpholino diethyl ether (polyurethane catalyst) from Huntsman Sample Preparation Standard Preparation Procedure 1: Ground Ethylvinyl Acetate Polymers.

While the precise values for the particle size distribution are not critical to the invention, the ethylene vinyl acetate polymers used in the examples were mechanically ground to the size distribution set forth in Table 1 below:

TABLE 1

| Rotap Information (U.S Standard Sieves) | % of polymer on screen |
|---|---|
| 35 Mesh Screen (500 microns) | <0.5% |
| 40 Mesh Screen (425 microns) | <35% |
| 60 Mesh Screen (250 microns) | <45% |
| 80 Mesh Screen (180 microns) | <20% |
| 100 Mesh Screen (150 microns) | <10% |
| 140 Mesh Screen (106 microns) | <10% |
| Pan (<140 Mesh Screen) | <10% |

Standard Preparation Procedure 2: Ground Polypropylene.

While the precise values for the particle size distribution are not critical to the invention, the polypropylene polymers used in the examples were mechanically ground to the size distribution set forth in Table 2 below:

TABLE 2

| Rotap Information (U.S Standard Sieves) | % of polymer on screen |
|---|---|
| 40 Mesh Screen (425 microns) | <0.5% |
| 60 Mesh Screen (250 microns) | <15-35% |
| 80 Mesh Screen (180 microns) | <15-25% |
| 100 Mesh Screen (150 microns) | <5-10% |
| 140 Mesh Screen (106 microns) | <10-15% |
| Pan (<140 Mesh Screen) | <20-50% |

Standard Preparation Procedure 3: Liquid Polymer Compositions.

Unless otherwise specified, the same experimental procedure was used to prepare each Liquid Polymer Composition described in the accompanying examples. In all cases, inhibitors (e.g., antioxidants), when used, were premixed with a sufficient amount of the second component (i.e., the liquid carrier) to form a solution, emulsion, dispersion or suspension. A second solution or dispersion was prepared by premixing the other minor components such as waxes, tackifiers, and the like, with another aliquot of the liquid carrier to form a secondary solution, emulsion, dispersion or suspension. The two aliquots were then blended together along with any remaining liquid carrier to form the balance of the liquid carrier solution for the overall composition. The various polymeric powders and, additionally, other major optional solid components were blended and dispersed into the liquid carrier solution using agitation to make the Liquid Polymer Compositions. This process was followed for ease of experimentation and is not intended to limit the possibilities of other modes, sequences or methods of forming Liquid Polymer Compositions.

Test Procedures

Standard Test Procedure 1: Density Reduction/Blowing Efficiency.

Density reduction testing was carried out by pumping the Liquid Polymer Composition samples at specified pressure on a hydraulic pump with a 15:1 pumping ratio to a reactor as described in the '859 patent. Approximately 5 g to 15 g of each sample was dispensed in a tared 50 ml beaker with volume calibrations at various pressures and temperatures. During this step, the material was melted to become a substantially homogeneous, molten solution or dispersion as occurs with the hot-melt compositions described in the '583 patent. Blowing efficiency was measured as the weight of the solidified foam in the beaker divided by the total volume filled by the dispensed adhesive.

Standard Test Procedure 2: Bond Time.

Bond time testing was carried out by pumping the liquid emulsion, dispersion or suspension at a specified pressure on a hydraulic pump with a 15:1 pumping ratio to a reactor set at a variable temperature generally described in the '859 patent. The heating and any resultant chemical reactions occurred in the period of time defined as being the moment the Liquid Polymer Composition sample entered the heated reaction zone in the reactor to the moment that the dispensed material solidified on as a foamed solid material on a substrate.

To determine the weight of adhesive composition applied, a 1.5 inch strip of adhesive was dispensed onto a piece of masking tape. After the adhesive cooled, the 1.5 inch adhesive strip was removed from the masking tape and weighed. This was done three times and the average of the weights was registered as the Average Weight of Bead to normalize the data taken on the adhesive performance.

To determine adhesive performance, a corrugated cardboard substrate was first attached to a 656 g base plate and then a 1.5 inch strip of the adhesive composition was dispensed on the substrate while the substrate (attached to said plate) was passed under a liquid hot melt dispenser (specifically a Hydromatic™ from Liquid Polymer Corporation, Lorain, Ohio) at a conveying speed of 75 per minute. After dispensing the adhesive, and after waiting for a variable period of pre-lamination time (t1), a second corrugated substrate of equal dimensions was laminated to the top of the first substrate under constant pressure for a variable period of time under pressure (t2). Next, the second substrate was vertically lifted to test the laminated structure's ability to support the weight of the base plate without delaminating. The shortest period of time under pressure (t2) that can be tolerated without leading to delamination was defined as the Bond Time (three consecutive passing tests of separate laminates are required before a process condition was deemed to yield a Bond Time). The Normalized Bond Time was then derived at by taking the (Bond Time t2)*Average Weight of Bead)/0.10 grams. A shorter Bond Time correlates with faster and more effective adhesives.

EXAMPLE 1

The aforementioned preparation procedures were used to prepare Liquid Polymer Composition samples RA-RI. The amount of each component in each sample is shown in weight percent in Table 3 below (Note: the amounts shown in Table 3 for water, Celogen® 780, methanol and hexane are the amount above the weight of the base Liquid Polymer Composition RA):

TABLE 3

|  | RA | RB | RC | RD | RE | RF | RG | RH | RI |
|---|---|---|---|---|---|---|---|---|---|
| FE532 EVA | 11.43 | 11.43 | 11.43 | 11.43 | 11.43 | 11.43 | 11.43 | 11.43 | 11.43 |
| ATEVA ® 1231 | 26.67 | 26.67 | 26.67 | 26.67 | 26.67 | 26.67 | 26.67 | 26.67 | 26.67 |
| A-C 925P | 11.90 | 11.90 | 11.90 | 11.90 | 11.90 | 11.90 | 11.90 | 11.90 | 11.90 |
| Soy Bean Oil | 38.00 | 38.00 | 38.00 | 38.00 | 38.00 | 38.00 | 38.00 | 38.00 | 38.00 |
| EASTOTAC ® H115 | 5.50 | 5.50 | 5.50 | 5.50 | 5.50 | 5.50 | 5.50 | 5.50 | 5.50 |

TABLE 3-continued

|  | RA | RB | RC | RD | RE | RF | RG | RH | RI |
|---|---|---|---|---|---|---|---|---|---|
| Sebacic Acid | 6.00 | 6.00 | 6.00 | 6.00 | 6.00 | 6.00 | 6.00 | 6.00 | 6.00 |
| IRGANOX ® HP 2225 | 0.50 | 0.50 | 0.50 | 0.50 | 0.50 | 0.50 | 0.50 | 0.50 | 0.50 |
| Water | — | — | — | — | 0.25 | 0.50 | 0.75 | — | — |
| CELOGEN ® 780 | — | 0.03 | 0.06 | 0.09 | — | — | — | — | — |
| Methanol | — | — | — | — | — | — | — | 0.89 | — |
| Hexane | — | — | — | — | — | — | — | — | 2.34 |

EXAMPLE 2

Liquid Polymer Compositions RA through RH formed in Example 1 were each separately tested in accordance with Test Procedure 1: Density Reduction/Blowing Efficiency. The test results are reported in Table 4 below.

TABLE 4

| | Density Reduction (g/ml) | | |
|---|---|---|---|
| | 320° F. | 350° F. | 380° F. |
| RA | 0.833 | — | 0.714 |
| RB | 0.833 | — | 0.556 |
| RC | 0.833 | — | 0.476 |
| RD | 0.847 | — | 0.564 |
| RE | 0.480 | 0.380 | 0.330 |
| RF | 0.380 | 0.330 | 0.280 |
| RG | 0.290 | 0.200 | 0.180 |
| RH | 0.260 | 0.210 | 0.210 |
| RI | 0.360 | 0.270 | 0.230 |

The comparative measurements reveal that in the absence of a foaming agent (i.e., Liquid Polymer Composition RA), little to no density reduction was achieved. When a conventional foaming agent was used (i.e., Liquid Polymer Compositions RB, RC and RD), a significant density reduction was achieved, but only when the temperature was high enough to activate the decomposition of the compound (Note: the decomposition product of azodicarbonamide is predominantly nitrogen, which is considered to be a non-reactive blowing agent).

When a non-reactive inert gas (n-hexane) was used (i.e., Liquid Polymer Composition RI), a significant density reduction was also realized. Unlike azobisdicarbonamide, no decomposition reaction was required since hexane itself is a non-reactive foaming gas. Consequently, n-hexane was observed to provide a density reduction at a significantly lower temperature than azodicarbonamide. It should be noted that depending on the nature of the end-use application, a lower foaming temperature can sometimes be desirable. And while n-hexane provides this potential benefit, it is considered to be a volatile organic compound ("VOC"), like many other non-reactive foaming agents, and therefore it would not be the most desirable candidate for use as a blowing agent.

On the other hand, a non-VOC reactive blowing agent such as water (i.e., Liquid Polymer Compositions RE, RE and RG) was observed to provide a significant density reduction over a broad range of temperatures. Thus, water as a reactive blowing agent provides the dual benefit of being a non-VOC gas while simultaneously facilitating foaming over a broad range of temperatures.

Methanol (i.e., Liquid Polymer Composition RH) provided a similar result as compared to water and n-hexane. Other reactive gases such as ethanol, primary and secondary amines, and the like, would be expected to provide a similar benefit in these systems.

EXAMPLE 3

Liquid Polymer Compositions RA, RB, RC and RE formed in Example 1 were pumped at a pressure of 60 psi according to Test Procedure 2: Normalized Bond Time. The data is reported in Table 5 below:

TABLE 5

| | Normalized Data in Seconds | | |
|---|---|---|---|
| | 320° F. | 350°F. | 380° F. |
| RA | 0.43 | 1.57 | 1.73 |
| RB | 4.64 | 2.31 | 8.85 |
| RC | 2.03 | 2.52 | 6.38 |
| RE | 0.52 | 2.80 | 3.50 |

This example shows that under lower temperature conditions, when the adhesive is foamed with a conventional foaming agent like azodicarbonamide (Liquid Polymer Compositions RB and RC), the foamed structure is surprisingly slower to set than when the adhesive is foamed with water (Liquid Polymer Composition RE). This result illustrates a further advantage of water beyond those mentioned previously. Namely, water is not only a non-VOC foaming agent that promotes lower temperature foaming, it is also capable of minimizing the impact of the foam structure on set time.

EXAMPLE 4

Liquid Polymer Compositions RJ, RK, RL and RM were formed by dispersing the solid ingredients in the weight percent amounts listed in Table 6 into mineral oil at room temperature (into 40 ml glass jars with lids). The dispersions were hand mixed with a spatula. Note that for the case of formulation RK, the water was dispersed in the formulation approximately 5 minutes before the formulation was melt processed on a hot plate as described low. In the cases of formulations RL and RM, the water was dispersed into the formulations, and then the formulations were aged for approximately 16 hours prior to melt processing on the hot plate.

TABLE 6

| | RJ | RK | RL | RM |
|---|---|---|---|---|
| FE-532 EVA | 36.89 | 36.70 | 36.70 | 35.64 |
| E43 Maleated PP | 16.39 | 16.31 | 16.31 | 15.84 |
| Sebacic Acid | 5.74 | 5.71 | 5.71 | 5.54 |
| I-44 Nanomer | — | — | — | 2.9 |
| Mineral Oil | 40.98 | 40.78 | 40.78 | 39.60 |
| Distilled Water | — | 0.50 | 0.50 | 0.48 |
| Side 1 % Fiber Tear | 60 | 100 | 100 | 100 |
| Side 2 % Fiber Tear | 20 | 30 | 60 | 100 |

An aliquot of the adhesive (1 to 2 grams) was placed onto a 4"×4" piece of aluminum foil. The foil was placed onto a hot plate at 385° F. and was allowed to set for one minute. The "hot melt" form of the adhesives was then mixed with a spatula until visual homogeneity was achieved. At this point, one half of a 2 cm×3 cm sized paper coupon (common stock from the non-coated side of either a cereal box or beverage package) was dipped into the hot melt solution so that the sized side of the paper was half-covered with the hot melt solution (referred to as "side 1" in this example). The coupon was removed and was then pressed (with moderate pressure by hand) against one-half of a second coupon of equal size (referred to as "side 2" in the present example) so that the lot melt was sandwiched between the paper coupons in lap-shear fashion. Moderate pressure was maintained for 10 seconds, and then the sample was allowed to cool. After cooling to room temperature, and after a specified period of time, the lap shear samples were twisted by hand to force a tearing failure at the bonded interface. Samples were qualitatively evaluated for the percentage of cohesive failure in the paper stock ("fiber tear") under the contact area of the adhesive (100%=complete fiber tear, 0%=cohesive failure in the adhesive, intermediate values equate to partial fiber tear). The results, which are reported in Table 7 below, represent the averages from 10 sample sets.

TABLE 7

|  | RJ | RK | RL | RM |
|---|---|---|---|---|
| Side 1 % Fiber Tear | 60 | 100 | 100 | 100 |
| Side 2 % Fiber Tear | 20 | 30 | 60 | 100 |

When water was added to the formulation (formulations RK and RL), the percent fiber tear was observed to increase on both side 1 and side 2. This improvement was further amplified when surface treated nano-sized montmorillonite was added to the formulation (Liquid Polymer Composition RM). The improvement of adhesion in the presence of water illustrates that water is capable of performing a reactive function in the adhesive composition, via mechanisms that may include but are not necessarily limited to reactions between carboxylic acids (sebacic acid) and maleic anhydride moieties (from the maleated PP). Consequently, when water is added to the formulation as a blowing agent, it has the unique distinction of being classified as a "reactive blowing agent" Thus, in addition to providing the unique benefits of yielding a foamed material over a broad range of temperatures, water has the potential to improve the performance of the adhesive via reacting in the polymeric matrix.

EXAMPLE 5

Liquid Polymer Compositions BA, BB and BC were prepared according to standard Liquid Polymer Preparation Procedure 1 and tested according to Test Procedure 2. The amount of each constituent, by weight percent, and the bond times are reported in Table 8. It can be seen that higher water leads to generally reduced bond times.

TABLE 8

|  | BA % | BB % | BC % |
|---|---|---|---|
| FE532 | 9.50 | 9.45 | 9.50 |
| 1820 EVA | 24.60 | 24.48 | 24.60 |
| Soy Bean oil | 42.00 | 41.79 | 41.50 |
| AC 925 (MAPF) | 4.27 | 4.25 | 3.90 |
| AC 1660 (PP) | 17.00 | 16.91 | 17.00 |

TABLE 8-continued

| Water | 0.50 | 0.99 | 2.00 |
|---|---|---|---|
| AC 8 (PE) | 1.91 | 1.90 | 1.93 |
| Erucamide | 0.096 | 0.096 | 0.075 |
| PLURONIC ® F127 | 0.132 | 0.131 | — |
| Bond Time Results | BA | BB | BC |
| 320° F./50 psi BT (sec) | 0.75 | 0.75 | 0.75 |
| 320° F./50 psi WI (gram) | 0.09 | 0.09 | 0.10 |
| 320° F./70 psi BT (sec) | 0.75 | 0.75 | 0.50 |
| 320° F./70 psi WT (gram) | 0.19 | 0.15 | 0.19 |
| 320° F./90 psi BT (sec) | 1.00 | 0.50 | 0.50 |
| 320° F./90 psi WI (gram) | 0.28 | 0.27 | 0.31 |
| 350° F./50 psi BT (sec) | 2 | 0.5 | 0.50 |
| 350° F./50 psi WT (gram) | 0.09 | 0.13 | 0.11 |
| 350° F./70 psi BT (sec) | 1 | 0.75 | 0.50 |
| 350° F./70 psi WT (gram) | 0.21 | 0.25 | 0.26 |
| 350° F./90 psi BT (sec) | 0.75 | 0.75 | 0.75 |
| 350° F./90 psi WT (gram) | 0.38 | 0.36 | 0.42 |
| 380° F./50 psi BT (sec) | 0.5 | 0.75 | 0.75 |
| 380° F./50 psi WT (gram) | 0.16 | 0.17 | 0.17 |
| 380° F./70 psi BT (sec) | 0.75 | 0.75 | 0.75 |
| 380° F./70 psi WT (gram) | 0.29 | 0.29 | 0.32 |
| 380° F./90 psi BT (sec) | 0.75 | 0.75 | 0.50 |
| 380° F./90 psi WT (gram) | 0.4 | 0.46 | 0.47 |

EXAMPLE 6

Liquid Polymer Compositions HA through HF were prepared according to standard Liquid Polymer Composition Preparation Procedure 3 to have a composition as set forth in Table 9 below, and tested according to Test Procedure 2. To determine the extent of stringing, a dispenser was pointed horizontally at a 12" plastic form that was set to be passed by the dispenser with 2" separation. The 12" plastic form was passed by a hybrid plastisol hot melt dispenser (Hydromatic™ from Liquid Polymer Corporation, Lorain, Ohio) at a conveying speed of 75'/minute. The dispenser was turned on for 8", turned off for 1" and turned on for 1". This was done three times and the average was taken as the values. The processing or stringing was then related to the weights obtained for the various sections on the form with 0 weights (reported in grams) at the beginning, middle and end being the theoretical ideal. The material was pumped at a temperature of 389° F. and a pressure of 90 psi with hydraulic pump ration of 15:1.

TABLE 9

|  | HA | HB | HC | HD | HE | HF |
|---|---|---|---|---|---|---|
| FE532 EVA | 11.43 | 11.43 | 11.43 | 11.43 | 11.43 | 11.43 |
| ATEVA ® 1231 | 26.67 | 26.67 | 26.67 | 26.67 | 26.67 | 26.67 |
| A-C 925P | 11.90 | 11.90 | 11.90 | 11.90 | 11.90 | 11.90 |
| Soy Bean Oil | 38.00 | 38.00 | 38.00 | 38.00 | 38.00 | 38.00 |
| EASTOTAC ® H115 | 5.50 | 5.50 | 5.50 | 5.50 | 5.50 | 5.50 |
| Sebacic Acid | 6.00 | 6.00 | 6.00 | 6.00 | 6.00 | 6.00 |
| IRGANOX ® HP 2225 | 0.50 | 0.50 | 0.50 | 0.50 | 0.50 | 0.50 |
| Water | — | 0.36 | 0.50 | — | — | 0.36 |
| Ionic (AB) | — | 8 | 8 | — | — | — |
| BIOTERGE ® AS-40 | — | — | 3 | 1.5 | 0.75 | — |
| TERGITOL ™ 15-S-3 | — | — | — | — | — | 3 |
| Beginning Tail | 0.01 | 0.00 | 0.00 | 0.00 | 0.00 | 0.00 |
| 8" Bead | 0.99 | 1.02 | 1.06 | 1.67 | 1.89 | 2.53 |
| Ending Tail | 0.02 | 0.02 | 0.00 | 0.02 | 0.01 | 0.00 |
| 1" Bead | 0.14 | 0.12 | 0.15 | 0.20 | 0.22 | 0.38 |
| Ending Tail | 0.01 | 0.01 | 0.00 | 0.01 | 0.02 | 0.02 |

In Example HA and HB, the results show excessive stringing and relatively low output. Surprisingly, in Example HC, it was discovered that a step change in improvement in stringing could be achieved. In Examples HD and HE it can easily be seen that a 50-75% change in output and minimal, if any, stringing has been achieved. This was totally unexpected and makes possible delivery techniques much more accessible in high volume, high speed applications. HF provided the most unique results with very high output and virtually no evidence of stringing.

EXAMPLE 7

Liquid Polymer Compositions CA through CH were prepared according to standard Liquid Polymer Preparation Composition Procedure 3 with relative quantities of each component shown in weight percent in Table 10 below. It should be noted that this example represents a case where the liquid Soy Bean Oil and the solid Eastotac H115 were brought together to form the liquid phase as taught above. The Liquid Polymer Compositions were tested according to a modified Test Procedure 1 described below.

In all the samples CA through CH, a visual observation was made regarding the foam cell structure and stability for various emulsifiers and surfactants. Samples CA and CB produced medium to coarse foam cells from the dispenser that immediately began to coalesce, break and collapse upon delivery to the cup. The use of the Ionic (AB)$_n$ surfactant in the Samples CC and CD and the reactive blowing agent (water) surprisingly provided a fine, celled polymeric structure which held its structure in spite of the very severe conditions of temperature, pressure drop and dispense rate. Samples CE through CH demonstrate that this structure was obtained due to the presence of the (AB)$_n$ surfactant in the material. The test results are reported in Table 10 below.

TABLE 10

| Experiment Ingredient | CA % | CB % | CC % | CD % | CE % | CF % | CG % | CH % |
|---|---|---|---|---|---|---|---|---|
| FE532 EVA | 11.43 | 11.43 | 10.8 | 10.8 | 11.02 | 11.09 | 11.34 | 11.09 |
| ATEVA ® 1231 | 26.67 | 26.67 | 25.1 | 25.1 | 25.70 | 25.87 | 26.47 | 25.87 |
| A-C 925P | 11.90 | 11.90 | 11.2 | 11.2 | 11.47 | 11.55 | 11.82 | 11.55 |
| Soy Bean Oil | 38.00 | 38.00 | 35.1 | 35.1 | 36.63 | 36.86 | 37.71 | 36.86 |
| EASTOTAC ® H115 | 5.50 | 5.50 | 5.2 | 5.2 | 5.3 | 5.34 | 5.46 | 5.34 |
| Sebacic Acid | 6.00 | 6.00 | 7.9 | 7.9 | 5.78 | 5.82 | 5.96 | 5.82 |
| IRGANOX ® | 0.50 | 0.50 | 0.47 | 0.47 | 0.48 | 0.49 | 0.5 | 0.49 |
| CELOGEN ® 780 | 0.06 | — | — | — | — | — | — | — |
| Water | — | 0.50 | 0.36 | 0.36 | 0.50 | — | — | — |
| Ionic (AB)n | — | — | 3.90 | 3.90 | — | — | — | — |
| BIOTERGE ® AS-40 | — | — | — | 3.00 | 3.12 | 3 | 0.75 | — |
| TERGITOL ™ 15-S-3 | — | — | — | — | — | — | — | 3 |
| Stable Foam | NO | NO | YES | YES | NO | NO | NO | NO |

EXAMPLE 8

Liquid Polymer Composition sample FA was prepared according to standard Liquid Polymer Preparation Procedure 1 with relative quantities of each component shown in weight percent in Table 11 below.

TABLE 11

|  | FA |
|---|---|
| FE532 EVA | 11.35 |
| ATEVA ® 1231 | 26.45 |
| A-C 925P | 11.80 |

TABLE 11-continued

|  | FA |
|---|---|
| Soy Bean Oil | 37.65 |
| EASTOTAC ® H115 | 5.50 |
| Sebacic Acid | 6.00 |
| IRGANOX ® | 0.50 |
| Water | 0.25 |
| Glass Spheres | 0.50 |

Coupons made of corrugate used for creating case packages were sealed with FA and also with a conventional hot melt composition Instant-Lok 34-2635, Hot Melt Adhesive, National Adhesives, which is designated as FB in Table 12 below. The coupons were then cut and put in an oven at 140° F. for 48 hours. The percent fiber tear was measured on the top and bottom and recorded. It can be seen from the data reported in Table 12 below that the conventional hot melt product (FB) has poor performance. At 250° F., the conventional hot melt composition (FB) failed whereas Liquid Polymer Composition FA according to the invention continued to exhibit fiber tear.

TABLE 12

|  | FA % Fiber after 48 Hour/140° F. | FB % Fiber after 48 Hour/140° F. |
|---|---|---|
| Coupon 1 | 100/100 | 50/50 |
| Coupon 2 | 100/100 | 60/0 |
| Coupon 3 | 100/100 | 0/0 |
| Coupon 4 | 100/100 | 0/0 |
| Coupon 5 | 100/100 | 0/0 |
| Coupon 6 | 100/100 | 0/40 |
| Coupon 7 | 100/100 | 30/50 |
| Coupon 8 | 100/100 | 40/0 |
| Coupon 9 | 100/100 | 0/25 |
| Coupon 10 | 100/100 | 40/50 |

EXAMPLE 9

Liquid Polymer Composition samples BD through BH ere prepared according to standard Liquid Polymer Preparation Procedure 3 with relative quantities of each component shown in weight percent in Table 13 below. The samples were then tested for bond time according to standard Test Procedure 2. The results are reported in Table 13 below.

TABLE 13

|  | BD | BE | BF | BG | BH |
|---|---|---|---|---|---|
| FE 532 | 10.00 | 10.00 | 10.00 | 10.00 | 9.50 |
| 1231 EVA | 25.25 | 24.94 | 24.25 | 24.25 | 22.50 |
| 2830 EVA | 0 | 0 | 2.50 | 2.50 | — |
| AC 925A | 7.00 | 7.00 | 6.50 | 6.50 | 6.50 |
| AC 1660 | 15.75 | 15.75 | 14.75 | 14.75 | 14.50 |
| Soybean Oil | 41.50 | 41.50 | 41.50 | 41.50 | 42.00 |
| H$_2$O | 0.50 | 0.50 | 0.50 | 0.50 | — |
| Behr Paint | 0.00 | 0.30 | 0.00 | 0.30 | 5.00 |
| 320° F./50 psi | 0.07 g 4 sec | 0.14 g 2 sec | 0.11 g 4 sec | 0.12 g 2 sec | 0.10 g Fail |
| 320° F./70 psi | 0.24 g 0.75 sec | 0.31 g 1 sec | 0.27 g 0.5 sec | 0.31 g 0.5 sec | 0.18 g 2.0 sec |
| 320° F./90 psi | 0.51 g 0.75 sec | 0.47 g 0.5 sec | 0.45 g 0.5 sec | 0.58 g 0.5 sec | 0.33 g 0.5 sec |

TABLE 13-continued

|  | BD | BE | BF | BG | BH |
|---|---|---|---|---|---|
| 350° F./50 psi | 0.11 g<br>2 sec | 0.13 g<br>0.75 sec | 0.14 g<br>2 sec | 0.19 g<br>0.75 sec | 0.13 g<br>0.50 sec |
| 350° F./70 psi | 0.3 g<br>1 sec | 0.32 g<br>0.75 sec | 0.31 g<br>2 sec | 0.36 g<br>0.75 sec | 0.24 g<br>0.50 sec |
| 350° F./90 psi | 0.52 g<br>NA | 0.51 g<br>0.5 sec | 0.46 g<br>0.75 sec | 0.63 g<br>0.5 sec | 0.52 g<br>0.75 sec |
| 380° F./50 psi | 0.16 g<br>2 sec | 0.15 g<br>2 sec | 0.15 g<br>2 sec | 0.18 g<br>1 sec | 0.11 g<br>4 sec |
| 380° F./70 psi | 0.41 g<br>NA | 0.38 g<br>0.5 sec | 0.36 g<br>0.5 sec | 0.49 g<br>0.5 sec | 0.30 g<br>1.0 sec |
| 380° F./90 psi | 0.6 g<br>1 sec | 0.64 g<br>0.5 sec | 0.61 g<br>0.5 sec | 0.84 g<br>0.5 sec | 0.54 g<br>0.75 sec |

The data in Table 13 shows that, in all but a couple of instances, the bond time was significantly reduced in the formulations containing latex paint (BE and BG) as compared to comparable formulations that did not contain latex paint (BD and BE, respectively). Interestingly, the latex paint also resulted in the production of very fine, uniform and stable cells, which is believed to aid in the invention.

EXAMPLE 10

Liquid Polymer Composition samples BI through BO were prepared according to standard Liquid Polymer Preparation Procedure 3 with relative quantities of each component shown in weight percent in Table 14 below. The samples were then tested for bond time according to standard Test Procedure 2. The results are reported in Table 14 below.

TABLE 14

|  | BI | BJ | BK | BL | BM | BN | BO |
|---|---|---|---|---|---|---|---|
| E532 | 12.00 | 11.65 | 8.00 | 9.58 | 9.50 | 9.50 | 10.05 |
| 1231 | 27.00 | 26.21 | 27.00 | 23.70 | 24.04 | 24.04 | 24.37 |
| MAPP:AC 925A | 6.00 | 8.74 | 7.00 | 6.80 | 6.71 | 6.71 | 7.04 |
| PP:AC 1660 | 12.00 | 11.65 | 12.00 | 15.30 | 15.75 | 15.75 | 15.83 |
| Water | — | — | — | 1.00 | — | — | 0.25 |
| SBO | 43.00 | 41.75 | 43.00 | 43.62 | 43.00 | 43.00 | 42.21 |
| Behr Paint | — | — | — | — | — | 1.50 | — |
| Polymer Polyol | — | — | 3.00 | — | — | — | — |
| UCAR ™ 9189 | — | — | — | — | 1.00 | 1.00 | — |
| T-700 Silica | — | — | — | — | — | — | 0.25 |
| Bond Time Comparisons |  |  |  |  |  |  |  |
| 300° F./50 psi | NA | NA | Fail<br>0.07 g | NA | NA | NA | NA |
| 300° F./70 psi | NA | NA | 0.50 sec<br>0.19 g | NA | NA | NA | NA |
| 300° F./90 psi | NA | NA | 0.50 sec<br>0.31 g | NA | NA | NA | NA |
| 320° F./50 psi | 1.10 sec<br>0.13 g | 2.10 sec<br>0.10 g | 2.10 sec<br>0.20 g | 4.00 sec<br>0.07 g | Fail<br>0.02 g | Fail<br>0.02 g | Fail<br>0.04 g |
| 320° F./70 psi | 1.10 sec<br>0.23 g | 2.10 sec<br>0.21 g | 1.10 sec<br>0.30 g | NA | NA | NA | NA |
| 320° F./90 psi | 0.75 sec<br>0.35 g | 2.10 sec<br>0.27 g | 0.50 sec<br>0.46 g | 2.00 sec<br>0.30 g | 0.75 sec<br>0.19 g | 0.75 sec<br>0.19 g | 0.50 sec<br>0.30 g |
| 350° F./50 psi | 4.35 sec<br>0.14 g | 2.10 sec<br>0.14 g | 2.10 sec<br>0.18 | NA | NA | NA | NA |
| 350° F./70 psi | 2.10 sec<br>0.27 g | 2.10 sec<br>0.31 g | 2.10 sec<br>0.33 g | 4.00 sec<br>0.18 g | 2.00 sec<br>0.14 g | 1.00 sec<br>0.10 g | 0.50 sec<br>0.18 g |
| 350° F./90 psi | 1.10 sec<br>0.43 g | 1.10 sec<br>0.48 g | 0.75 sec<br>0.53 g | NA | NA | NA | NA |
| 380° F./50 psi | 1.10 sec<br>0.16 g | 1.10 sec<br>0.23 g | 0.75 sec<br>0.22 g | 4.00 sec<br>0.10 g | 2.00 sec<br>0.07 g | 4.00 sec<br>0.06 g | 0.75 sec<br>0.14 g |
| 380° F./70 psi | 1.10 sec<br>0.32 g | 0.75 sec<br>0.32 g | 0.75 sec<br>0.44 g | NA | NA | NA | NA |
| 380° F./90 psi | 1.10 sec<br>0.45 g | 1.10 sec<br>0.54 g | 0.50 sec<br>0.70 g | 2.00 sec<br>0.44 g | 1.00 sec<br>0.33 g | 0.75 sec<br>0.30 g | 0.75 sec<br>0.42 g |

BK had equal to or better bond times than BI and BJ at almost all temperatures and pressures. The controls, BI and BJ were not run at the lower temperatures as it is was known that the results would be extremely poor or failures. It is noteworthy that the weights in most cases were heavier in the case of BK, which indicates improved process hygiene could be expected. In BK, the liquid carrier for the dispersion is a glycerol started polyalkylene oxide polyol consisting of about 90% propylene oxide units and 10% ethylene oxide units of about 3000 molecular weight. At higher levels, the carrier could be considered as an option for Component 2.

Experiments BM and BN showed improved bond times at reduced weights over BL in all but 320° F. and 50 psi where the weights and size of the bead were so small that measurements were difficult and experienced large variability.

EXAMPLE 11

Liquid Polymer Composition samples LA and LB were prepared according to standard Liquid Polymer Preparation Procedure 3 with relative quantities of each component shown in weight percent in Table 15 below.

TABLE 15

|  | LA | LB |
|---|---|---|
| E532 | 7.50 | 11.65 |
| EVA 1820 | 22.00 | — |
| EVA 2604 | — | 26.00 |

TABLE 15-continued

|  | LA | LB |
|---|---|---|
| MAPP:AC 925A | 3.86 | 9.00 |
| PP:AC 1660 | 15.00 | 12.00 |
| PE:AC8 | 1.91 | — |
| Water | 0.60 | — |
| SBO | 42.00 | 41.00 |
| Polydextrose | 7.00 | — |
| Dextrin | — | 12.00 |
| PLURONIC ® F-127 | 0.13 | — |

The samples were then tested for bond time according to standard Test Procedure 2. The results are reported in Table 16 below.

TABLE 16

|  | LB | LB |
|---|---|---|
| 280° F./50 psi | NA | Fail 0.08 g |
| 280° F./70 psi | 0.50 sec 0.17 g | 2.10 sec 0.06 g |
| 300° F./50 psi | NA | 0.50 sec 0.29 g |
| 300° F./70 psi | 0.75 sec 0.20 g | 0.50 sec 0.47 g |
| 300° F./90 psi | NA | 0.50 sec 0.64 g |
| 320° F./50 psi | 0.75 sec 0.32 g | 2.10 sec 0.14 g |
| 320° F./70 psi | NA | 0.75 sec 0.40 g |
| 320° F./90 psi | 0.75 sec 0.32 g | 2.10 sec 0.64 g |
| 350° F./50 psi | NA | 2.10 sec 0.18 g |
| 350° F./70 psi | 0.50 sec 0.29 g | 1.10 sec 0.23 g |
| 350° F./90 psi | NA | 2.10 sec 0..61 g |
| 380° F./50 psi | 0.50 sec 0.22 g | 1.10 sec 0.23 g |
| 380° F./70 psi | NA | 0.75 sec 0.32 g |
| 380° F./90 psi | 0.75 sec 0.56 g | 1.10 sec 0.54 g |

LA and LB examples gave excellent bond time performance down to at least 280° F., which is substantially below the temperature for materials not containing a processing aid.

EXAMPLE 12

Liquid Polymer Composition samples G1 through G4 ere prepared according to standard Liquid Polymer Preparation Procedure 3 with relative quantities of each component shown in weight percent in Table 17 below. Each Liquid Polymer Composition was evaluated for bond time (i.e., the time to hold substrates together), set time (i.e., the time necessary to hold substrate together without movement, but not fiber tear), adhesion to corrugate, exudation (5 days at room temperature), plastisol viscosity, estimated plastisol viscosity and film strength (tensile). The data is also reported in Table 17 below.

TABLE 17

|  | G1 | G2 | G3 | G4 |
|---|---|---|---|---|
| EVA: 1820 | 25 | 25 | 26.8 | 26.8 |
| MAPP: AC 925A | 3.5 | 3.5 | 3.7 | 3.7 |
| PP: AC 1660 | 2.3 | 2.3 | 1.5 | 0.5 |
| Soybean Oil | 48.6 | 48.6 | 46 | 46 |
| STADEX ® 82 | 8.6 | 8.6 | 9.2 | 9.2 |
| STADEX ® 124 | 6 | 5 | — | — |
| STA-LITE ® III | 6 | 6 | 12.8 | 12.8 |
| HYSTAR ® 3375 | — | 1 | 0 | 1 |
| % Sum | 100 | 100 | 100 | 100 |
| % Green Content | 69.2 | 69.2 | 68 | 69 |
| Results/Observations |  |  |  |  |
| Bond Time (Time to hold substrate together) | Medium | Medium | Slow | Medium |
| Set Time (sec) Time necessary to hold substrate together without movement, but not fiber tear | 2 | 2 | 3 | 2 |
| Adhesion to Corrugate | Excellent | Excellent | Excellent | Excellent |
| Exudation (5 days RT) | None | None | None | None |
| Plastisol Viscosity | Low | Low | Low | Low |
| Estimated Plastisol Viscosity | 1000 cPs | 1000 cPs | 1000 cPs | 1000 cPs |
| Film Strength (Tensile) | Medium | Medium/High | Medium | Medium/High |

This example demonstrates that it is possible to use greater than 20% of highly hydrophilic oligomers and polymers such as dextrins, polydextrose and hydrogenated starch hydrolysates, instead of hydrophobic polymers such as ethylene vinyl acetate, polypropylene, maleated polypropylene, and the like. This resulted in a hydrophobic liquid carrier, soybean oil, being absorbed and/or reacted, leading to excellent adhesion, ultra-low viscosities and no exudation of the oil.

EXAMPLE 13

Liquid Polymer Composition samples MA and MB were prepared according to standard Liquid Polymer Preparation Procedure 3 with relative quantities of each component shown in weight percent in Table 18 below.

TABLE 18

|  | MA | MB |
|---|---|---|
| EVA: 2604 | 22.00 | 22.00 |
| MAPP: AC 925A | — | 8.00 |
| PP: AC 1660 | 16.00 | 8.00 |
| Soybean Oil | 37.00 | 37.00 |
| CaCO₃ | 25.00 | 25.00 |

Samples MA and MB demonstrates that finely divided $CaCO_3$ with ground EVA 2604 can be used to form a pumpable liquid polymer composition that has a high solids content (53% by weight) without the need for emulsified ethylene vinyl acetate polymers (e.g., EVA 532) to reduce viscosity. Sample MA does not contain maleated polypropylene, the presence of which in some applications can lead to unwanted chemical reactions and subsequent gas bubbles.

EXAMPLE 14

Liquid Polymer Compositions X1 and X2 were prepared according to modified standard Liquid Polymer Preparation Procedure 3, with relative quantities of each component shown in weight percent in Table 19 below. The procedure was modified to prevent premature curing of the NuvPolymer 631-S moisture cure adhesive. Accordingly, all of the materials were kept as dry as possible. The soy bean oil was degassed and dried using molecular sieves, the tackifier was dried, and the MICROTHENE® FE 532, ATEVA® 1231 and AC 925A polymers were dried at 45° C. to minimize residual water content. In addition, the composition was prepared and kept under a nitrogen atmosphere to avoid exposing the composition to atmospheric water (humidity).

TABLE 19

|  | X1 | X2 |
|---|---|---|
| Soybean Oil | 42 | 38.84 |
| SYLVATAC ® RE 100L | 0 | 3.16 |
| NuvPolymer 631-S | 4.44 | 4.59 |
| CaO | 4.76 | 4.76 |
| MICROTHENE ® FE 532 | 11.43 | 11.43 |
| ATEVA ® 1231 | 25.71 | 25.71 |
| AC 925A | 11.43 | 11.43 |
| JEFFCAT ® DMDEE | 0.23 | 0.08 |

Compositions X1 and X2 were processed through a TURBOMELTER™ device, which heated and mixed the compositions to a substantially homogenous fused molten material. The molten compositions were dispensed and utilized to adhere blocks of wood together. To accelerate latent (i.e., post dispensing) curing, the blocks of wood were placed into a sealed plastic bag together with a wetted paper towel. The adhesive bond strength was good immediately after the polymer set, but increased in strength upon exposure to water.

Compositions X1 and X2 demonstrate that it is possible to produce compositions that are pumpable at room temperature, that can be processed to form molten blends that solidify upon being cooled, and which can be crosslinked using moisture to create extremely strong adhesive bonds. Such compositions are particularly suitable for use in structural applications (e.g., building and furniture construction etc.), because the resulting adhesive bond is less susceptible to environmental changes (temperature, moisture etc.). As noted above, a solid adhesive rapidly forms upon cooling, which over time and exposure to moisture (ambient or supplied) undergoes a latent cure to form a thermoset material. This is in contrast to the other examples disclosed in the application, which form thermoplastic solids upon cooling.

EXAMPLE 15

Liquid Polymer Composition T was prepared according to standard Liquid Polymer Preparation Procedure 3 with relative quantities of each component shown in weight percent in Table 20 below.

TABLE 20

|  | T |
|---|---|
| EVA: 1231 | 23.72 |
| EVA: FE532 | 9.30 |
| MAPP: AC 925A | 6.66 |
| PP: AC 1660 | 14.70 |
| PE: AC 8 | 2.00 |
| Soybean Oil | 42.12 |
| Paint: Behr | 1.50 |

Liquid Polymer Composition T was then processed through various configurations of a TURBOMELTER™ device (TURBOMELTER™ is a trademark of Liquamelt Corp.) identified in Table 21 below (Note: the configurations are described in the specification and illustrated in the accompanying drawings). In each case, the processed material was dispensed through a 0.016" diameter nozzle and tested for bond time according to standard Test Procedure 2. The results are reported in Table 21 below.

TABLE 21

| TURBOMELTER ™ Configuration | TA Straight through NO mixer | TB Straight through with mixer | TC Helix TURBOMELTER ™ | TD Split Flow TURBOMELTER ™ |
|---|---|---|---|---|
| 320° F./50 psi BT | Fail | Fail | 2.00 | 0.75 |
| 320° F./50 psi WT | 0.02 | 0.02 | 0.05 | 0.04 |
| 320° F./70 psi BT | 2.00 | 4.00 | 1.00 | 1.00 |
| 320° F./70 psi WT | 0.1 | 0.07 | 0.11 | 0.11 |
| 320° F./90 psi BT | 4.00 | 4.00 | 1.00 | 0.75 |
| 320° F./90 psi WT | 0.16 | 0.14 | 0.20 | 0.23 |
| 350° F./50 psi BT | Fail | 4.00 | 0.75 | 0.50 |
| 350° F./50 psi WT | 0.05 | 0.04 | 0.06 | 0.08 |
| 350° F./70 psi BT | 4.00 | 2.00 | 0.50 | 0.75 |
| 350° F./70 psi WT | 0.11 | 0.09 | 0.19 | 0.16 |
| 350° F./90 psi BT | 4.00 | 2.00 | 0.75 | 0.75 |
| 350° F./90 psi WT | 0.19 | 0.17 | 0.31 | 0.28 |
| 380° F./50 psi BT | Fail | 1.00 | 0.75 | 0.75 |
| 380° F./50 psi WT | 0.05 | 0.05 | 0.11 | 0.11 |
| 380° F./70 psi BT | 4.00 | 1.00 | 0.75 | 1.00 |
| 380° F./70 psi WT | 0.14 | 0.12 | 0.23 | 0.22 |
| 380° F./90 psi BT | 2.00 | 0.75 | 0.75 | NA |
| 380° F./90 psi WT | 0.22 | 0.21 | 0.45 | NA |

The rapid transfer of energy to polymer systems with low thermal conductivity and the appropriate mixing is absolutely critical to providing the highest performing products. In this example, the straight flow through design taught in the prior art is improved when a mixer is added to the outlet. By incorporating a helix design to impart greater heat transfer and mixing per unit volume, it can be seen that there is still more improvement. In the most preferred embodiment of the invention, the split flow TURBOMELTER™ gives the best results as there is a high ratio of surface area to glue, the volume of glue per length is increased and the mixing that occurs at each vein proves significant.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition comprising:
   a liquid carrier; and
   solid particles disposed in the liquid carrier, the solid particles comprising a sustainable material selected from the group consisting of starches, derivatives of starches, cellulosic materials, derivatives of cellulosic materials and combinations thereof,
   the composition being in a form selected from the group consisting of an emulsion, a dispersion, a suspension, and combinations thereof,
   the composition being in a non-molten pumpable state at ambient temperatures of from about 32° F. to 140° F.,
   the composition forming a substantially homogeneous, fused molten blend when first heated to a temperature greater than about 140° F., and
   the substantially homogenous molten blend subsequently becoming a fused solid material when it cools to a temperature below 140° F.

2. The composition according to claim 1 wherein the solid particles comprising a sustainable material are one or more selected from the group consisting of dextrins, hydrogenated dextrins, polydextrose, maltodextrins, hydrogenated maltodextrins, corn syrup solids and hydrogenated starch hydrolysates.

3. The composition according to claim 1 wherein the starches, derivatives of starches, cellulosic materials and derivatives of cellulosic materials are hydrogenated.

4. The composition according to claim 1 wherein the liquid carrier is selected from the group consisting of animal oil, plant oil, glycerol, and water.

5. The composition of claim 1 wherein the liquid carrier is selected from the group consisting of animal oil and plant oil.

6. The composition of claim 1 wherein the liquid carrier is water.

7. The composition of claim 1 additionally comprising one or more materials selected from the group consisting of pigments, fillers and glass treated and untreated microspheres.

8. The composition of claim 1 additionally comprising one or more materials selected from the group consisting of aluminum hydroxide, titanium dioxide, kaolin, calcium carbonate, silica and silicates.

9. The composition of claim 1 wherein the solid particles comprising a sustainable material are present in an amount from 30% to 80% by weight of the composition.

10. An adhesive comprising the composition of claim 1.

11. A package comprising one or more substrates adhered together using the composition of claim 1.

12. The package of claim 11 wherein the one or more substrates comprise cellulose fibers.

* * * * *